(12) United States Patent
Ding

(10) Patent No.: US 12,370,779 B2
(45) Date of Patent: Jul. 29, 2025

(54) ENERGY-EFFICIENT WINDOW COATINGS TRANSMITTABLE TO WIRELESS COMMUNICATION SIGNALS AND METHODS OF FABRICATING THEREOF

(71) Applicant: LabForInvention, Fremont, CA (US)

(72) Inventor: Guowen Ding, San Jose, CA (US)

(73) Assignee: Labforinvention, Fremont, CA (US)

( * ) Notice: Subject to any disclaimer, the term of this patent is extended or adjusted under 35 U.S.C. 154(b) by 0 days.

(21) Appl. No.: 18/787,662

(22) Filed: Jul. 29, 2024

(65) Prior Publication Data

US 2025/0074035 A1 Mar. 6, 2025

Related U.S. Application Data

(60) Provisional application No. 63/624,364, filed on Jan. 24, 2024, provisional application No. 63/579,237, filed on Aug. 28, 2023.

(51) Int. Cl.
*B32B 3/14* (2006.01)
*B32B 17/10* (2006.01)

(52) U.S. Cl.
CPC .......... *B32B 17/10183* (2013.01); *B32B 3/14* (2013.01); *B32B 17/10036* (2013.01);
(Continued)

(58) Field of Classification Search
CPC .. B32B 3/14; B32B 3/22; B32B 3/266; B32B 17/10036; B32B 17/10183
See application file for complete search history.

(56) References Cited

U.S. PATENT DOCUMENTS

| 3,837,907 A | 9/1974 | Berglund et al. |
| 4,256,161 A | 3/1981 | Chisum |

(Continued)

FOREIGN PATENT DOCUMENTS

| CN | 115104043 B | 9/2022 |
| FI | 127500 B | 7/2018 |

(Continued)

OTHER PUBLICATIONS

International Application Serial No. PCT/US21/21891, Search Report and Written Opinion mailed May 20, 2021, 7 pgs.
(Continued)

*Primary Examiner* — Elizabeth E Mulvaney
(74) *Attorney, Agent, or Firm* — Polygon IP, LLP

(57) ABSTRACT

Described are energy-efficient signal-transparent window assemblies and methods of fabricating thereof. These assemblies remain IR-blocking properties while allowing signal penetration and remain substantially transparent within the visible spectrum with no features detectable to the naked eye. This performance is achieved by isolating conductive layers into discrete cells via gap patterning. The second coating stack's line widths are at least 0.4 micrometer greater than the gaps among the primary stacks. The thickness of the primary stack increases from zero to full thickness near the gap, with a sidewall transition length exceeding 0.2 micrometers. The fabrication process involves lithography for patterning, PVD coating, and post-clean and high-temperature treatments. In some examples, a transparent organic thin layer is provided between the second coating stack and the primary stack or the substrate. Additionally, a thick dry-photoresist method in a special lithography process could significantly reduce manufacturing cost.

20 Claims, 11 Drawing Sheets

(52) U.S. Cl.
CPC .... *B32B 17/10201* (2013.01); *B32B 17/1022* (2013.01); *B32B 2307/418* (2013.01); *B32B 2419/00* (2013.01)

(56) References Cited

U.S. PATENT DOCUMENTS

| | | |
|---|---|---|
| 5,364,685 A | 11/1994 | Nakashima et al. |
| 6,730,389 B2 | 5/2004 | Voeltzel |
| 8,927,069 B1 | 1/2015 | Estinto et al. |
| 9,587,303 B2 | 3/2017 | Palacios-Laloy |
| 2016/0201189 A1 | 7/2016 | Palacios-Laloy |
| 2018/0036839 A1 | 2/2018 | Estinto et al. |
| 2021/0283884 A1 | 9/2021 | Ding |
| 2022/0221636 A1 | 7/2022 | Ding |

FOREIGN PATENT DOCUMENTS

| | | |
|---|---|---|
| JP | H06247745 A | 9/1994 |
| JP | 2862452 B2 | 3/1999 |
| WO | 2013122181 A1 | 8/2013 |
| WO | 2014033007 A1 | 3/2014 |
| WO | 2014126135 A1 | 8/2014 |
| WO | 2016205104 A1 | 12/2016 |
| WO | 2021183756 A1 | 9/2021 |
| WO | 2022150832 A1 | 7/2022 |

OTHER PUBLICATIONS

International Application Serial No. PCT/US22/70078, International Preliminary Report on Patentability mailed Jul. 20, 2023.

*Deposit Photoresist*

*UV Exposure*

*Develop and Clean*

ENERGY-EFFICIENT WINDOW COATINGS TRANSMITTABLE TO WIRELESS COMMUNICATION SIGNALS AND METHODS OF FABRICATING THEREOF

CROSS-REFERENCE TO RELATED APPLICATIONS

This application claims the benefit under 35 U.S.C. § 119 (e) of U.S. Provisional Patent Application 63/579,237 by Guowen Ding, entitled: "Energy-Efficient Window Coatings Transmittable to Wireless Communication Signals and Methods of Fabricating Thereof", filed on 2023 Aug. 28 and U.S. Provisional Patent Application 63/624,364 by Guowen Ding, entitled: "Energy-Efficient Window Coatings Transmittable to Wireless Communication Signals and Methods of Fabricating Thereof", filed on 2024 Jan. 24, both of which are incorporated herein by reference in their entirety for all purposes.

BACKGROUND

Windows tend to be the least energy-efficient component in buildings. For example, radiation-based heat transfer represents about 60% of the total energy loss through standard windows. Energy-efficient windows utilize special coatings to reduce this heat transfer, e.g., by blocking the IR (infrared) radiation, corresponding to wavelengths between 5 micrometers to 50 micrometers. However, energy-efficient windows also tend to block wireless communication signals with wavelengths longer than 50 micrometers or even longer than 0.5 millimeters. This signal blocking negatively impacts cellular reception, Wi-Fi access, and the like. Conventional approaches use external antennas to rebroadcast signals inside the building. However, such systems are complex, expensive, and provide minimal coverage inside the buildings. Furthermore, covering all areas inside the building with such systems can be difficult.

SUMMARY

Provided are novel energy-efficient signal-transparent window assemblies and methods of fabricating thereof. These window assemblies are specifically configured to allow selective penetration of millimeter waves, representing current and future wireless signal spectrum. This signal penetration is provided while IR-blocking properties are retained. Furthermore, the window assemblies remain substantially transparent within the visible spectrum with no specific features detectable to the naked eye. This unique performance is achieved by patterning conductive layers such that the conductive layer edges remain protected during most fabrication steps and the fabrication. As such, the conductive layers are encapsulated and separated from the environment while retaining separation between individual disjoined structures of these layers. For example, a barrier layer and/or a dielectric layer may extend over the conductive layer edge. The patterning is achieved by forming spacers on the substrate and depositing a stack over these photoresist structures. The spacers are removed thereafter.

Clause 1. An energy-efficient signal-transparent window assembly comprising: a window substrate; a first layer disposed over the window substrate; a conductive layer disposed over the first layer such that the first layer is disposed between the conductive layer and the window substrate, wherein the conductive layer is formed by multiple disjoined structures separated by gaps; and a second layer disposed over the conductive layer such that the conductive layer is disposed between the second layer and the first layer, wherein: the first layer, the conductive layer, and the second layer form a plurality of primary stacks and a plurality of secondary stacks over at least a portion of the window substrate, the plurality of secondary stacks forms a pattern, defined by pattern lines, partially on the window substrate, and partially on a top surface of the plurality of primary stacks, and each of the pattern lines has a width larger than a gap separating the multiple disjoined structures by at least 0.4 micrometer.

The first layer can comprise one or multiple dielectric layers, e.g., with a barrier layer positioned between a pair of these dielectric layers. As such, the first layer may be also referred to as a first dielectric layer or a first dielectric layer assembly. The conductive layer is formed by multiple disjoined structures separated by gaps. The energy-efficient signal-transparent window assembly also comprises a second layer disposed over the conductive layer such that the conductive layer is disposed between the first layer and the second layer. The second layer can comprise one or multiple dielectric layers, e.g., with a barrier layer positioned between a pair of these dielectric layers. As such, the second layer may be also referred to as a second dielectric layer or a second dielectric layer assembly. Each layer above could comprise multiple layers with different materials. The first layer, the conductive layer, and the second layer form a plurality of primary stacks and a plurality of secondary stacks over at least a portion of the window substrate, and a portion of the first stacks.

Clause 2. The energy-efficient signal-transparent window assembly of clause 1, wherein the second layer comprises a barrier material, which comprises one of nickel or titanium.

Clause 3. The energy-efficient signal-transparent window assembly of clause 1, wherein each of the plurality of secondary stacks directly interfaces the window substrate.

Clause 4. The energy-efficient signal-transparent window assembly of clause 1, wherein each of the plurality of secondary stacks is attached to the window substrate and the plurality of primary stacks using a connection layer comprising one of (a) a continuous material layer and (b) a non-continuous material layer and air voids.

Clause 5. The energy-efficient signal-transparent window assembly of clause 4, wherein the connection layer comprises carbon at a concentration of greater than 10% atomic.

Clause 6. The energy-efficient signal-transparent window assembly of clause 4, wherein the connection layer has a thickness of 1-1000 nanometers.

Clause 7. The energy-efficient signal-transparent window assembly of clause 4, wherein the connection layer is formed using a solution comprising one or more functional groups selected from the group consisting of C=O, —OH, COO, and C—O—C.

Clause 8. The energy-efficient signal-transparent window assembly of clause 1, wherein the width of each stack in the plurality of secondary stacks is between 1 micrometer and 100 micrometers.

Clause 9. The energy-efficient signal-transparent window assembly of clause 1, further comprising a protective layer disposed over the plurality of primary stacks and the plurality of secondary stacks.

Clause 10. The energy-efficient signal-transparent window assembly of clause 9, wherein the protective layer comprises a transparent material with a refractive index between 1.6 and 1.9 at wavelength 550 nanometer.

Clause 11. The energy-efficient signal-transparent window assembly of clause 1, further comprising an additional window substrate, wherein the first layer, the conductive layer, and the second layer are positioned between the window substrate and the additional window substrate.

Clause 12. The energy-efficient signal-transparent window assembly of clause 1, wherein each stack in the plurality of primary stacks comprises two adjacent sidewalls formed by extending the second layer in each stack to the window substrate and completely sealing the conducting layer between the window substrate and the second layer.

Clause 13. The energy-efficient signal-transparent window assembly of clause 1, wherein the width of the secondary stack is between 2 and 10 micrometers.

Clause 14. An energy-efficient signal-transparent window assembly comprising: a window substrate; a first layer disposed over the window substrate; a conductive layer disposed over the first layer such that the first layer is disposed between the conductive layer and the window substrate, wherein the conductive layer is formed by multiple disjoined structures separated by gaps; and a second layer disposed over the conductive layer such that the conductive layer is disposed between the second layer and the first layer, wherein: the first layer, the conductive layer, and the second layer form a plurality of primary stacks, each comprising two sidewalls and separated from each other by the gaps, the gaps form a pattern, defined by pattern lines, and each of the pattern lines has a width larger than the gaps separating the multiple disjoined structures by between 0.4 and 6 micrometers.

Clause 15. The energy-efficient signal-transparent window assembly of clause 15, further comprising a protective layer disposed over the plurality of primary stacks, comprising a transparent material with a conductivity of less than 1 S/M.

Clause 16. The energy-efficient signal-transparent window assembly of clause 15, further comprising an additional window substrate, wherein the plurality of primary stacks is positioned between the window substrate and the additional window substrate.

Clause 17. An energy-efficient signal-transparent window assembly comprising: a window substrate; non-conductive spacers, forming a pattern on the window substrate, interfacing a portion of the window substrate, and blocking the portion of the window substrate; a first dielectric layer, interfacing the window substrate and the non-conductive spacers; a conductive layer, disposed over the first dielectric layer such that the first dielectric layer is disposed between the conductive layer and each of the window substrate and the non-conductive spacers; a second layer disposed over the conductive layer such that the conductive layer is disposed between the second layer and the first layer; and non-conductive structures positioned within the conductive layer and forming a plurality of primary stacks and a plurality of secondary stacks, wherein: the first layer, the conductive layer, and the second layer form a plurality of primary stacks and a plurality of secondary stacks over at least a portion of the window substrate, the plurality of secondary stacks forms a pattern, defined by spacer pattern lines, partially on the window substrate and partially on a top surface of the plurality of primary stacks, the spacer pattern lines comprise a top surface and a side surface, stacks of the plurality of secondary stacks are broken on the top surface or the side surface of the spacer pattern line thereby physically isolating the stacks and discontinuing the conductive layers along the spacer pattern lines.

Clause 18. The energy-efficient signal-transparent window assembly of clause 17, wherein the spacer pattern lines are formed using a lithography process with a photoresist thickness greater than 1.5 micrometers.

Clause 19. The energy-efficient signal-transparent window assembly of clause 17, further comprising forming a protective layer disposed over the stack and comprising a transparent material with a conductivity of less than 1 S/M.

Clause 20. The energy-efficient signal-transparent window assembly of clause 17, wherein the stack is bonded an additional window substrate such that the stack and the non-conductive spacers are positioned between the window substrate and the additional window substrate.

These and other examples are described further below with reference to the figures.

DETAILED DESCRIPTION

Figure 1A:
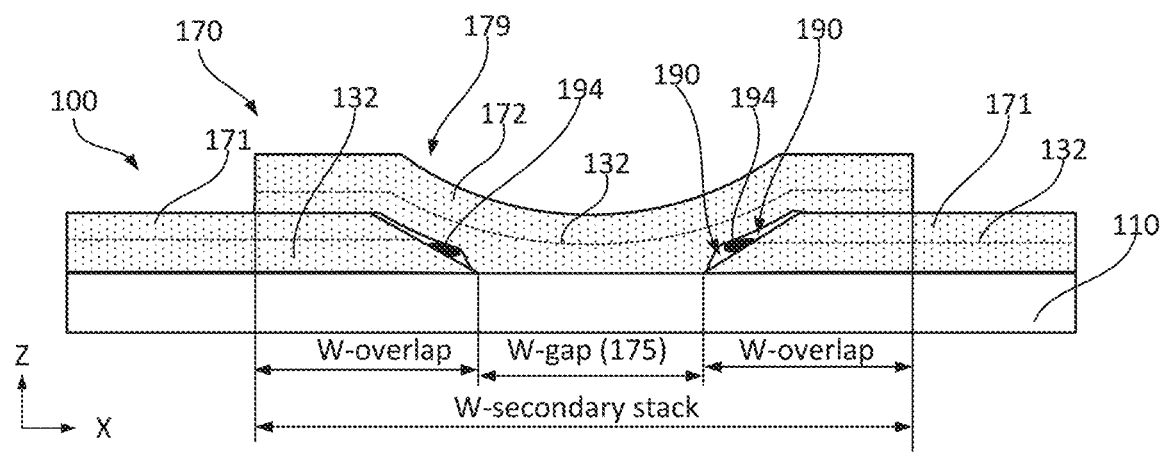
FIG. 1A is a schematic cross-sectional view of an energy-efficient signal-transparent window assembly, comprising a conductive layer formed by multiple disjoined structures, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Energy-efficient windows are becoming more popular in commercial and residential buildings as well as other applications. An energy-efficient window may comprise one or more conductive layers (such as silver-based layers), responsible for blocking IR radiation, in addition to various dielectric layers and barrier layers. These conductive layers may also be referred to as metal layers or transparent conductive oxide (TCO) layers. However, energy-efficient windows or, more specifically, conductive layers tend to interfere with the wireless signal transmission (e.g., cellular signal) due to signal attenuation. As noted above, conventional solutions involve the installation of distributed antenna systems (DAS) within buildings to promote signal propagation. However, this approach requires special equipment, additional power consumption, and additional cost.

It has been found that separating a conductive layer into multiple disjoined structures helps to reduce signal attenuation. It should be noted that the wavelength of electromagnetic waves, which can pass through this patterned conductive layer, depends on the opening size between the disjoined structures. More specifically, the wavelength depends on the opening width between pairs of adjacent disjoined structures, e.g., the largest opening width is smaller than the wavelength. For example, a continuous conductive layer may be formed over the substrate and subsequently patterned, e.g., removing small portions of this conductive layer and forming top-to-bottom/through openings (e.g., extending to the substrate).

However, the patterning process and subsequent exposure of conductive layer edges (within the openings) cause various durability issues with these conductive layers as well as aesthetics issues (e.g., unsightly visible line marks). As a result, patterning methods have not been widely adopted. Furthermore, patterning becomes very challenging when dealing with the 5th generation (5G) networks using wavelengths greater than 1 millimeter. Such wavelengths require openings smaller than 0.2 millimeters in width to achieve adequate signal transmission. Future generation networks are expected to use even shorter wavelengths that require smaller openings, which may be challenging to achieve with conventional laser scribing techniques.

Described herein are various examples of energy-efficient signal-transparent window assemblies and methods of fabricating thereof. These assemblies are transparent in the visible light region, allowing penetration of the electromagnetic waves at set wavelengths (e.g., carrying wireless communication signals), and are configured to block the IR radiation. For example, the transparency in the visible light region (e.g., wavelength 380-780 nanometers) may be between 10% and 100% transmission. In the same or other examples, the energy-efficient signal-transparent window assemblies allow penetration of the electromagnetic waves having a wavelength of 12.5 centimeters (corresponding to 2.4 GHz frequency) at only around 5 dB extra loss than that of an uncoated window substrate. Furthermore, the IR-blocking/emissivity is less than 0.15, in some examples. This value indicates that more than 85% of spectra between wavelength 5 micrometers to 50 micrometers are blocked by an energy-efficient signal-transparent window assembly. For comparison, conventional low-E windows (e.g., a sample from AGC Glass North America Alpharetta, GA) were found to have around 30 DB signal loss measured from 1 GHz to 5 GHz.

Furthermore, the energy-efficient signal-transparent window assemblies described herein do not have unsightly visible marks and have a pleasant aesthetic appearance, unlike laser-patterned low-E windows. For example, when a window assembly is inspected at an angle of 90° to its surface with a uniform backlight simulating daylight (e.g., light intensity 10,000 lux or above), no visible marks can be observed (i.e., not observable with the "naked eye").

The energy-efficient signal-transparent window assemblies described herein also have long-term durability. For example, an accelerated durability test, which involves dipping a sample into boiling water for one hour, does not reveal any visible marks with the inspection criteria presented above (e.g., the "naked eye" inspection and digital photo). Furthermore, no additional defects, which are attributable to this accelerated durability test, were detected under the microscope. Another accelerated durability was performed by baking a sample in a 650° C. oven for 8 minutes. Likewise, the microscope inspection did not reveal any additional defects.

Finally, the energy-efficient signal-transparent window assemblies allow wireless signal propagation of 5G signals (frequency of 6 GHz corresponding to 50-millimeter wavelength) and other like signals (e.g., future generation using higher frequencies and smaller wavelengths). In some examples, the opening width is 0.1 millimeters or even less, which is much smaller than the wavelength of these communication technologies.

Examples of Stack Gaps and Overlaps in Energy-Efficient Signal-Transparent Window Assemblies FIG. 1A illustrates one example of an energy-efficient signal-transparent window assembly 100, comprising a window substrate 110 and a stack assembly 170 comprising different stacks, such as primary stacks 171 and secondary stacks 172. Each stack may comprise a conductive layer, further aspects of which are described below with reference to FIG. 2.

Referring to FIG. 1A, in some examples, stack assembly 170 comprises primary stacks 171, e.g., formed on window substrate 110. These primary stacks 171 are separated from each other by stack gaps 175 as, e.g., is shown in FIG. 1A. These stack gaps 175 provide breaks in the conductive layers of the primary stacks 171. The segmented conductive layers, which are identified with dotted lines in FIG. 1A (and other figures further described below), can be referred to as disjoined structures 132. These disjoined structures 132 allow for wireless transmission through energy-efficient signal-transparent window assembly 100. The stack gaps 175 is defined as the gap width between two neighboring primary stacks 171 tip, and the tip is typical of first layer 120 or the top layer 150 materials of stacks 171, and those structure layers 120, 130, 140, 150, as one example shown in FIG. 2.

Referring to FIG. 1A, in some examples, stack assembly 170 also comprises secondary stack 172, which is formed over photoresist patches (e.g., as further described below with reference to FIGS. 7A-7D). In energy-efficient signal-transparent window assembly 100 (after the photoresist is removed), these secondary stacks 172 can completely or at least partially fill stack gaps 175 between primary stacks 171. It should be noted that the conductive layers of the primary stacks 171 remain disconnected even when the secondary stacks 172 fully or at least partially fill the stack gaps 175. In some examples, some photoresist might not completely removed, and leave some residue 194, which can form some voids 190 between the primary stacks 171 and secondary stacks 172 and/or between the window substrate 110 and the secondary stacks 172, e.g., as schematically shown in FIG. 1A. Specifically, the residue 194 and/or voids 190 forms after/during the photoresist removal operation, and in some case, the height of those residue 194 is less than 500 nanometers on average, or less than 100 nanometers, more specifically, less than 50 nanometers on average or even directly interfacing the window substrate and on the top of the portion of primary stacks.

Referring to FIG. 1A, in some examples, the secondary stack 172 is sized (e.g., the width in the X direction) and positioned (e.g., aligned relative to the stack gap 175 along the X direction) such that a part of the secondary stack 172 covers the stack gap 175 (and overlaps/directly interfaces) the window substrate 110 while other parts extend over the primary stack 171 or, more specifically, over the surface of the primary stack 171 that faces away from the window substrate 110. In other words, at least a portion of the primary stack 171 can extend/stacked between the window substrate 110 and the secondary stack 172, as schematically shown in FIG. 1A. Specifically, the secondary stacks 172 are wider than the corresponding stack gaps 175. In some examples, the overlap width ("W-overlap" in FIG. 1A), on each side of the gap 175, is at least 0.2 micrometers, at least 2 micrometers, at least 3 micrometers or even 5 micrometers. For example, the overlap width ("W-overlap" in FIG. 1A) can be 0.2-3 micrometers or, more specifically, 0.2-2 micrometers. This overlap ensures the overall performance and functionality of the window assemblies. This "W-overlap" is directly associated with the initial photoresist undercut amount. Specifically, the larger the undercut amount, the more unlikely or less conductive layer coating will be deposited below this undercut (e.g., along the sidewall) as described below with reference to FIG. 6E, in another words, the conductive layer can be protected by the sidewall from the $2^{nd}$ layer coating, e.g., to prevent the coating durability. In general, the thinner the photoresist, the smaller the undercut amount is required. For example, the photoresist may be at least 0.2 micrometers thick or, more specifically, at least 0.5 micrometers thick. Thus, the "W-overlap" may be at least 0.2 micrometers or even at least 0.5 micrometers. In some examples, the ratio of the photoresist thickness to the "W-overlap" is at least 0.75, at least 1, or even at least 1.5. On the other hand, too wide W-overlap could reduce the window energy saving efficiency due to some IR radiation being leaked through the pattern lines. Therefore, in some examples, the W-overlap is smaller than 5 micrometers, more specifically, smaller than 3 micrometers, or even smaller than 2 micrometers.

In some examples, the secondary stack 172 has a width ("W-secondary stack" in FIG. 1A) of less than 100 micrometers, less than 20 micrometers, or even less than 10 micrometers such as 1-100 micrometers or, more specifically, 2-10 micrometers. In the same or other examples, the stack gap 175 has a width ("W-gap" in FIG. 1A) of 0.2-20 micrometers or, more specifically, 0.5-5 micrometers. It should be noted that the sidewalls of the primary stacks 171 is nearly parrel to the window substrate 110 with a few degrees angle. As such, for purposes of this disclosure, the gap width is defined as the smallest distance between the two adjacent sidewalls (e.g., at the interface with the window substrate 110 in the example shown in FIG. 1A).

Figure 1B:
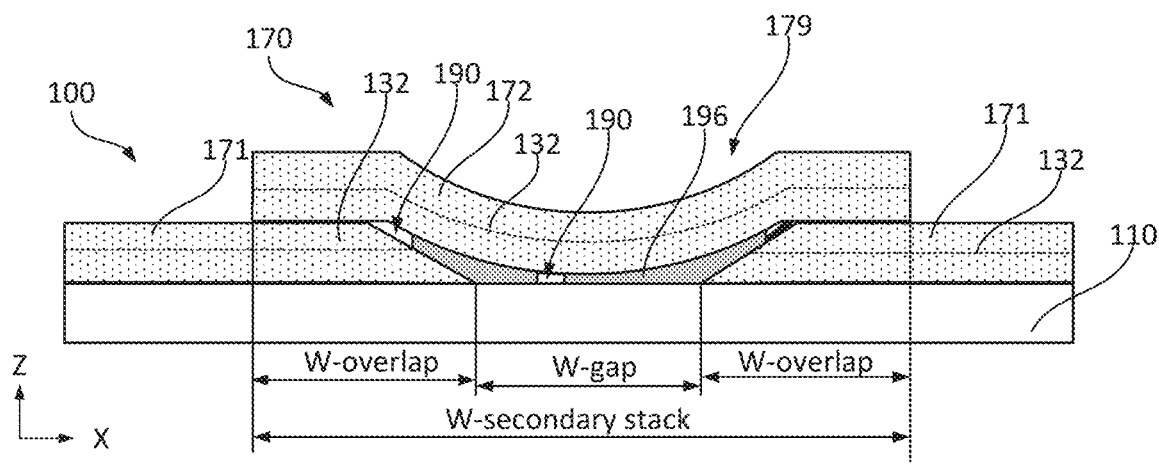
FIG. 1B is another schematic cross-sectional view of an energy-efficient signal-transparent window assembly, with a transparent organic layer to the structure at FIG. 1A comprising a conductive layer formed by multiple disjoined structures, in accordance with some examples.

Referring to FIG. 1B, in some examples, a transparent organic layer 196 is positioned between the secondary stack 172 and the window substrate 110 and/or between the secondary stack 172 and the primary stack 171. The transparent organic layer 196 can be a continuous film or a non-continuous film (e.g., with air voids 190). The thickness of this transparent organic layer 196 may be 1-1000 nanometers or, more specifically, 2-100 nanometers. The thickness of those voids 190 are the same or smaller than that of the organic layer 196. The transparent organic layer 196 may comprise carbon (element) with a concentration of at least 10% atomic or, more specifically, at least 20% atomic. The transparent organic layer 196 may be formed from photoresist remains and, in some examples, partially from a cleaning solvent and/or PVD coatings. In some examples, the transparent organic layer 196 functions as an adhesive intermediary, ensuring the robust attachment of the secondary stacks 172 to other components, e.g., the window substrate 110 and/or to the primary stacks 171. The transparency of the transparent organic layer 196 ensures that no patterning is visible, even under direct sunlight. The extinction co-efficient k of this lay is less than 0.1 at 550 nanometer wavelengths.

In some examples, the footprint of the transparent organic layer 196 is smaller than that of the secondary stack 172. As such, the transparent organic layer 196 is covered by the secondary stacks 172 and does not protrude outside of the boundary of the secondary stack 172.

Figure 1C:
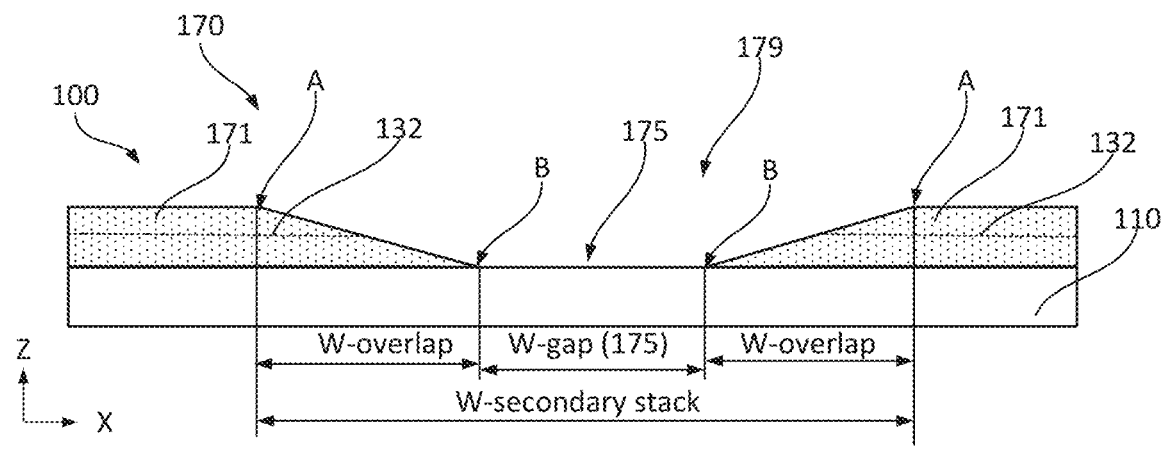
FIG. 1C is another schematic cross-sectional view of an energy-efficient signal-transparent window assembly, comprising a conductive layer formed by multiple disjoined structures, in accordance with some examples.

Referring to FIG. 1C, in some examples, the stack assembly 170 comprises only primary stacks 171 without secondary stacks 172. The pattern lines (formed by stack gaps 175) are still invisible to the human eyes. There are no diffraction pattern lines under strong light either, demonstrating excellent aesthetic performance. The film's mechanical durability is excellent, passing the alcohol cloth wiping test, i.e., after an alcohol cloth wiping the coated film, there is no damage along the pattern lines.

To achieve excellent optical aesthetic performance and durability performance, the W-overlap length, or sidewall length is 0.2-5 micrometers or, 0.2-3 micrometers, more specifically, 0.2-2 micrometers. Referring to the "secondary-stack free" example in FIG. 1C, the definition of W-overlap or sidewall length is the region from where the stack 171 coating thickness begins to thin (point "A" in FIGS. 1C and 2) until the stack 171 coating thickness reaches zero (point "B" in FIGS. 1C and 2). The starting and ending points of the coating film thickness can be determined from the curve of thickness by assuming a linear slope that intersects with the coating film's top and bottom surface extension lines.

The linear slope of the curve of thickness is chosen at the point of the curve at the middle height point of the primary stack thickness.

Examples of Stacks in Energy-Efficient
Signal-Transparent Window Assemblies

Figure 2:
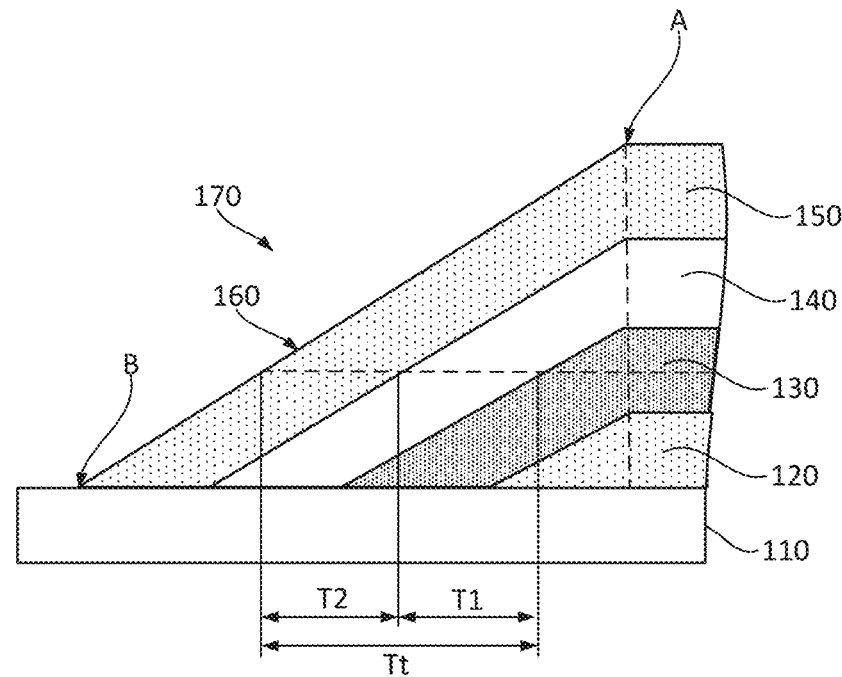
FIG. 2 is a schematic expanded view of a portion of the energy-efficient signal-transparent window assembly in FIGS. 1A-1C, in accordance with some examples.

Referring to FIG. 2, in some examples, each stack in stack assembly 170 comprises a conductive layer 130, a barrier layer 140, and a second dielectric layer 150. First layer 120, conductive layer 130, barrier layer 140, and second dielectric layer 150 can form a stack assembly 170, which may also be referred to as a low-E stack. In some examples, conductive layer 130 can comprise silver or silver alloys. In these examples, the first layer 120 can comprise a similar barrier layer to the layer 140 next to conductive layer 130 (e.g., directly interfacing conductive layer 130) to enhance the durability of conductive layer 130 or, more generally, of energy-efficient signal-transparent window assembly 100. Sometimes, the second layer can consist of multiple layers, such as the barrier layer 140 and the second dielectric layer 150. In other examples, conductive layer 130 can be formed using highly durable materials such as gold or transparent conductive oxide (TCO). In these other examples, barrier layer 140 may not be necessary, and conductive layer 130 may directly contact/interface first dielectric layer 120 and/or second dielectric layer 150.

First layer 120 is disposed over window substrate 110. In some examples, first layer 120 may comprise multiple disjoined portions that belong to different stack assemblies 170, e.g., as schematically shown in FIG. 1A. Conductive layer 130 is disposed over first layer 120 such that first layer 120 is positioned between conductive layer 130 and each of window substrate 110. Conductive layer 130 is formed by multiple disjoined structures, defined by the second stack pattern 179. It should be noted that multiple disjoined structures allow the transmission of electromagnetic waves through energy-efficient signal-transparent window assembly 100 as noted above. Barrier layer 140 is disposed over conductive layer 130 such that conductive layer 130 is disposed between the first layer 120 and barrier layer 140. Similar to first layer 120 and conductive layer 130, in some examples, barrier layer 140 comprises disjoined portions. Finally, the second layer 150 is disposed over barrier layer 140 such that barrier layer 140 is positioned between the second layer 150 and conductive layer 130. Similar to other components of energy-efficient signal-transparent window assembly 100, the second layer 150 comprises disjoined portions.

The composition and other structural features of each component will now be described in more detail. In some examples, the window substrate 110 comprises glass, plastics, or any materials that can support at least the first layer 120, conductive layer 130, barrier layer 140, and second layer 150. In some examples, window substrate 110 is transparent.

In some examples, a conductive layer 130 is configured to provide IR-blocking for energy saving while allowing penetration of signal-carrying electromagnetic waves. Some examples of materials suitable for conductive layer 130 include, but are not limited to, silver, silver alloys, copper, gold, indium tin oxide (ITO), and the like. In some examples, the sheet resistance of conductive layer 130 is smaller than 100 Ohm/square. In some examples, the thickness of conductive layer 130 is between 5 nanometers and 300 nanometers.

In some examples, conductive layer 130 comprises or is formed from gold or TCO (e.g., ITO). In these examples, a barrier layer is not needed (i.e., barrier layer 140 is not present in these examples). The first layer 120 and the second layer 150 are formed from the same material. Alternatively, the first layer 120 and second layer 150 are formed from different materials. In general, materials suitable for first layer 120 and second layer 150 include, but are not limited to, transparent dielectric materials such as zinc-tin oxide ($Zn_xSn_yO_z$) and silicon nitride ($Si_3N_4$). In some examples, the dielectric conductivity of the material forming the first layer 120 and/or second layer 150 is smaller than 1000 S/M (Siemens per meter) or, more specifically, smaller than 1 S/M. In some examples, the extinction coefficient is less than 0.1 at 550 nm. These materials may be selected for color tuning, e.g., to make the boundary of the discontinuous layer invisible. Additional color tuning may be achieved by controlling the thickness of the first layer 120 and the second layer 150. For example, first layer 120 and/or second layer 150 may have a thickness of 10-100 nanometers. In some examples, first layer 120 and/or second layer 150 allows for vacuum break during the fabrication of energy-efficient signal-transparent window assembly 100.

In some examples, a conductive layer 130 is patterned or, more specifically, formed by disjoined structures 132. The size of these disjoined structures 132 and the spacing between two adjacent ones of disjoined structures 132 are set by pattern 179. For example, the disjoined structures 132 in primary stacks 171 may have a width ($W_1$) of 0.05-5 millimeters or, more specifically, 0.1-2 millimeters. In the same or other examples, disjoined structures 132 in secondary stacks 172 may have a width ($W_2$) of 1-20 micrometers or, more specifically, between 2-10 micrometers. The width ($W_2$) should be greater than 2 micrometers to ensure a stable lithography process and to account for the budget of W-overlap. The width ($W_2$) should be less than 10 micrometers; otherwise, the heat radiation at room temperature through the secondary stack space could be significant, leading to lower energy-saving performance for the window. These parameters define the transmissibility of energy-efficient signal-transparent window assembly 100 to signal-carrying electromagnetic waves.

In some examples, a conductive layer 130 is silver or copper, or gold or their alloys, first layer 120 may comprise a dielectric material. In these examples, barrier layer 140 is positioned next to (e.g., directly interfacing) conductive layer 130 (e.g., between first layer 120 and conductive layer 130). In further examples, another barrier layer 140 can be positioned on the other side of conductive layer 130 (e.g., between the second layer 150 and conductive layer 130), which is used to protect conductive layer 130 from the environment and degradation (e.g., to protect silver in conductive layer 130 from oxidation). In some examples, the barrier layer is only layer 140 on the top of the conductive layer, without the barrier layer under the conductive layer 130. The materials suitable for one or both barrier layers 140 include, but are not limited to metals or metal oxides, metal nitrides, or metal oxynitrides, with nickel (Ni) or titanium (Ti), such as NiCr, $NiCrO_x$, $TiO_x$, NiTiNb, $NiTiNbO_x$. In some examples, the thickness of barrier layer 140 is between about 1 nanometers and 15 nanometers or, more specifically, between 2 nanometers and 10 nanometers.

Referring to FIG. 2, in some examples, each stack in stack assembly 170 comprises sidewalls 160 at least one of the barrier layer 140 and the second layer 150. Sidewalls 160 can be formed in situ while depositing barrier layer 140 and second layer 150. In some examples, each of the two adjacent sidewalls 160 is formed by both barrier layer 140 and second dielectric layer 150. Sidewalls 160 protect conductive layer 130 from the environment, e.g., second layer 150. In some examples, sidewalls 160 extend to window substrate 110. In some examples, sidewall 160 extends to first layer 120 which is on the top of window substrate 110.

Specifically, sidewalls 160 are formed by specifically tuning the deposition processes of conductive layer 130, barrier layer 140, and second layer 150. In some examples, the total sidewall thickness (identified as Tt in FIG. 2) is between 1 nanometers and 100 nanometers or, more specifically, between 2 nanometers and 20 nanometers. In the same or other examples, the contribution of barrier layer 140 to the total sidewall thickness (identified as $T_1$ in FIG. 2) is between about 0.1 nanometers and 5 nanometers or, more specifically, between 0.2 nanometers and 2 nanometer. Alternatively, barrier layer 140 is not a part of sidewalls 160. In the same or other examples, the contribution of the second layer 150 to the total sidewall thickness (identified as $T_2$ in FIG. 2) is between about 2 nanometers and 100 nanometers or, more specifically, between 2 nanometers and 15 nanometers. Alternatively, second layer 150 is not a part of sidewalls 160. It should be noted that the thickness of sidewall-forming portions of barrier layer 140 and/or second layer 150 can be different (e.g., smaller) than the corresponding thickness of barrier layer 140 and/or second layer 150 away from sidewalls 160 due to the deposition angle.

Figure 3A:
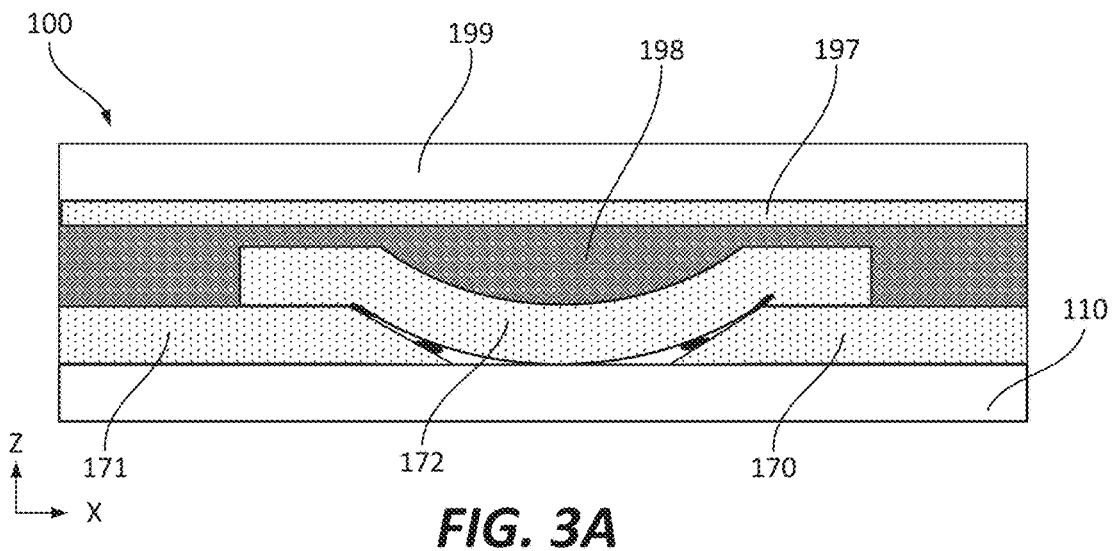
FIG. 3A is a schematic cross-sectional view of another example of the energy-efficient transparent window assembly, comprising a protective layer, and bonding layer, and another glass substrate.

FIG. 3A illustrates another example of energy-efficient signal-transparent window assembly 100, which comprises a protective layer 198. In this example, the protective layer 198 conforms to the entire surface of the second layer 150, and over both primary stacks 171 and secondary stacks 172, thereby forming an entire surface (on one side) of energy-efficient signal-transparent window assembly 100. Specifically, the protective layer 198 extends over all stacks 171. In some examples, the protective layer 198 is the only component forming sidewalls 160. Alternatively, sidewalls 160 are formed by protective layer 198 and one or both of barrier layer 140 and second layer 150. The thickness of protective layer 198 may be from 10 nanometers to 100 micrometers (or higher). In some examples, the protective layer 198 comprises a transparent material with an extinction coefficient of less than 0.1 at 550 nanometers. In the same or other examples, the protective layer 198 has a conductivity of less than 1 S/M.

In some examples, the protective layer 198 is a component forming sidewalls next to sidewalls 160 and the top dielectric layer for both primary stacks 171 and secondary stacks 172. The refractive index of protective layer 198 may be between 1.5 to 2.1, more specifically between 1.6 and 1.9. In other examples, protective layer 198 is two or multiple layers with the gradience refractive index, the layer next to stacks 171 and 172 are materials with a higher refractive index such as between 1.8 and 2.0, and the material on the opposite side that is far from the stack 171 and 172, are with a lower refractive index such as between 1.5 and 1.7. In these examples, the thickness of protective layer 198 may be from 10 nanometers to 100 micrometers (or higher). In some examples, protective layer 198 comprises a transparent material with an extinction coefficient of less than 0.1 at 550 nanometers wavelength.

In some examples, an additional material on the top of the protective layer 198 can be used for bonding to the additional glass substrate 199, e.g., as schematically shown in FIG. 3A. the additional bonding layer 197 can be formed, e.g., from polyvinyl butyral (PVB), thermoplastic polyurethane (TPU), and/or ethylene-vinyl acetate (cross-linked EVA), to form a laminated glass assembly. Pattern 179, formed by secondary stacks 172, may visually disappear, not observable by human eyes. In some examples, the additional bonding layer 197 alone or combined with the protective layer 198, or both may be formed from the same material (i.e., have the same composition) or different materials (i.e., have different compositions). The refractive index of the bonding material may be between 1.5 to 2.1 or, more specifically, between 1.6 and 1.9, which can enhance the aesthetic performance of the glass assembly.

Figure 3B:
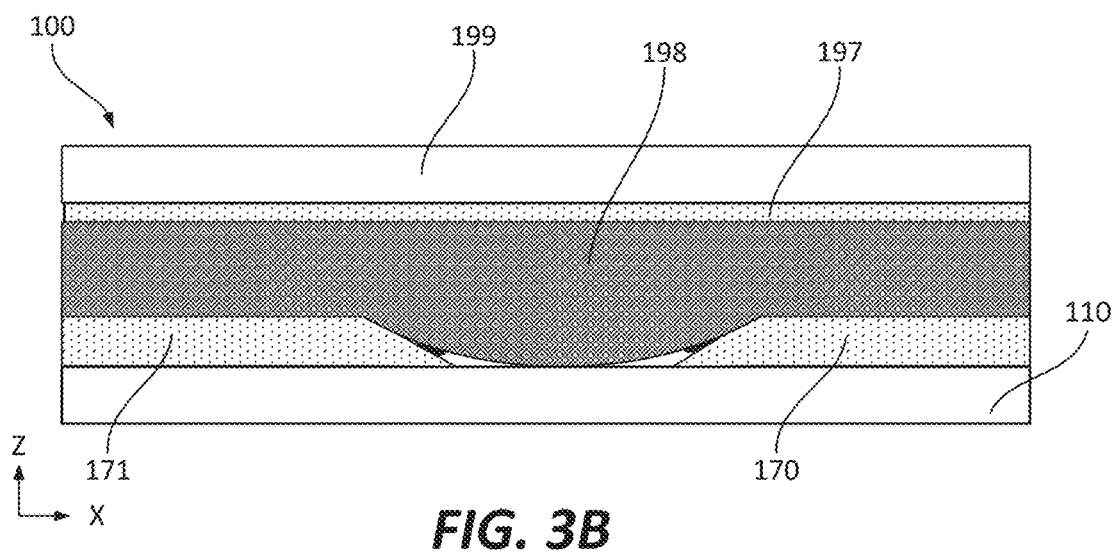
FIG. 3B is a schematic cross-sectional view of another example of the energy-efficient transparent window assembly, comprising a protective layer, and bonding layer, and another glass substrate.

Referring to FIG. 3B, in some examples, secondary stacks 172 are removed (or not formed) before positing a protective layer 198 over stack assembly 170. The removal of secondary stacks 172 can occur naturally during the glass cleaning process or other production processes, or for other purposes. The protective layer 198 directly contacts the substrate. There might be tiny voids or no voids between the protective layer 198 and the substrate or the surface of the primary stacks 171. From the perspective of signal penetration efficiency, there are no differences between FIG. 3A and FIG. 3B. However, in terms of visual aesthetic performance, some cases showed better performance for FIG. 3A.

In some examples, energy-efficient signal-transparent window assembly 100 is placed into an insulated glass unit (IGU) window, which features multiple panes of glass, separated by an inert gas or vacuum, widely used in buildings. For example, a protective layer 198 is configured to bond to an additional window substrate.

Figure 3C:
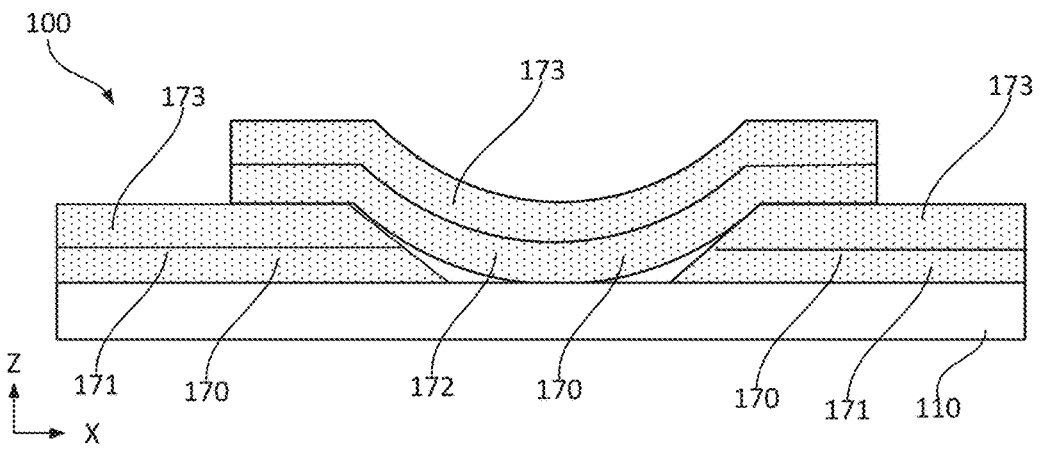
FIG. 3C is a schematic cross-sectional view of an energy-efficient signal-transparent window assembly with multiple low-E stacks formed on top of each other, in accordance with some examples.

Referring to FIG. 3C, in some examples, energy-efficient signal-transparent window assembly 100 comprises multiple low-E stacks, formed on top of each other, such as a stack assembly 170 and additional stack assembly 173, disposed over the stack assembly 170. Each low-E stack comprises a first layer 120, a conductive layer 130, a barrier layer 140, and a second layer 150. In some examples, one or more characteristics (e.g., composition, thickness, morphology) of at least one of the first layer 120, conductive layer 130, barrier layer 140, and second layer 150 can be different in different low-E stacks. The stack assembly 170 and additional stack assembly 173 can have the same dimensions or, more specifically, the footprints of stack assembly 170 and additional stack assembly 173 can coincide. Similar to stack assembly 170, additional stack assembly 173 can also include primary stacks 171 and secondary stacks 172. While FIG. 3C illustrates an example with two low-E stacks in the Z direction, one having ordinary skill in the art would understand that any number of low-E stacks can be arranged in this manner (e.g., three, four, five, or more).

Similar to FIG. 3A or FIG. 3B, the protection layer or bonding to an additional substrate for a laminated glass unit assembly, can be applied to the stacks shown in FIG. 3C.

Figure 4A:
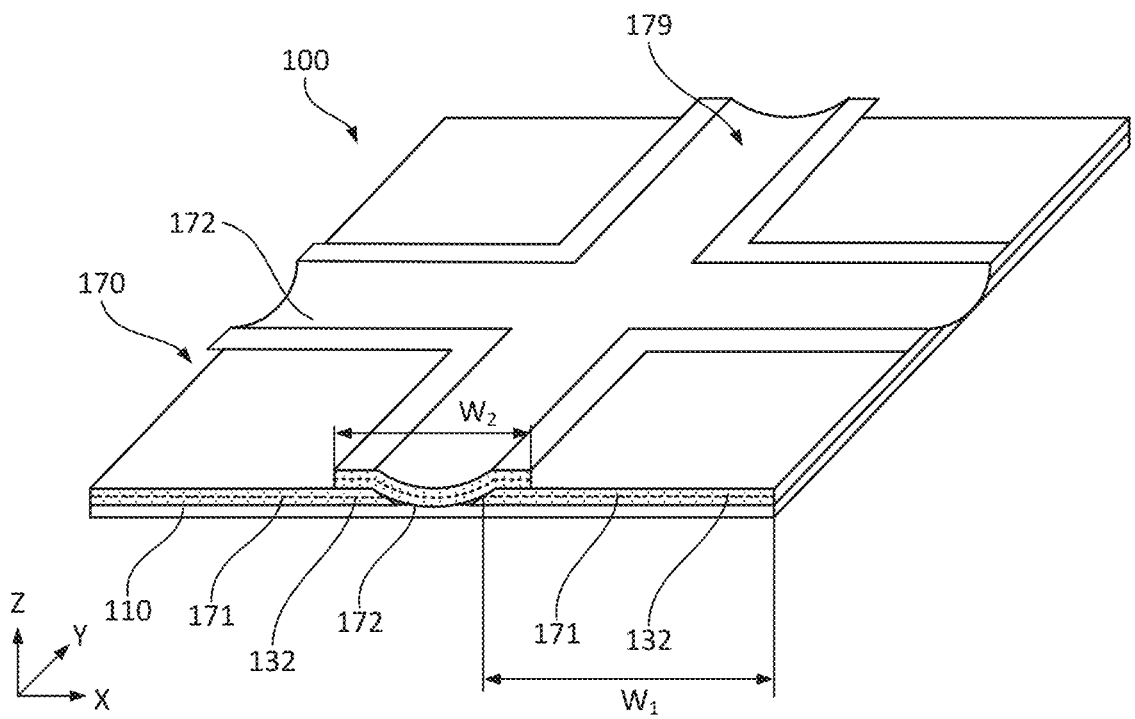
FIG. 4A is a perspective view of an energy-efficient signal-transparent window assembly, illustrating a pattern, formed by gaps between the multiple disjoined structures, in accordance with some examples.

FIG. 4A illustrates a perspective view of energy-efficient signal-transparent window assembly 100 showing different types of stacks, e.g., primary stacks 171 and secondary stacks 172. Secondary stacks 172 form a pattern 179.

For example, a pattern 179 can be such that each of primary stacks 171 has an enclosed shape to ensure the electrical separation between primary stacks 171 or, more specifically, between the conductive layers in these primary stacks 171 to enhance the permeability of energy-efficient signal-transparent window assembly 100 to wireless communication signals. In more specific examples, the dimension in each enclosed shape is less than 10 millimeters in any direction parallel to window substrate 110, again to enhance the permeability of energy-efficient signal-transparent window assembly 100. At the same time, the secondary stacks 172 form pattern lines of pattern 179. These pattern lines extend between each adjacent pair of primary stacks 171 and have a width of less than 100 micrometers to ensure that these pattern lines are not visible on energy-efficient signal-transparent window assembly 100. In other words, when a person casually looks at energy-efficient signal-transparent window assembly 100, energy-efficient signal-transparent window assembly 100 appears (to the "naked eye") as a homogeneous structure without any patterns.

While primary stacks 171 and secondary stack 172 may have the same structure and composition of individual components, primary stacks 171 and secondary stack 172 are formed in a different manner. Specifically, primary stacks 171 may be formed right away on window substrate 110, while secondary stacks 172 are formed over spacers, which are removed thereby causing secondary stack 172 to be positioned partially on window substrate 110 and partially on a portion of the top surface of stack 171. Additional details of forming primary stacks 171 and secondary stack 172 are described below with reference to FIG. 5.

In some examples, primary stacks 171 are wider than secondary stacks 172. One having ordinary skills would understand how the width can be defined for irregular shapes. For example, the largest dimension of a shape can be defined as a length. Width is defined as the largest dimension that is perpendicular to the length (e.g., within a plane that is parallel to the window substrate 110). It should be noted that both length and width are measured within a plane parallel to the surface of window substrate 110. As noted below, the width of secondary stacks 172 is determined by spacers, used to create a pattern. The width of these spacers can be selected to ensure signal transmission through energy-efficient signal-transparent window assembly 100.

Referring to FIG. 1A and FIG. 4A, in some examples, on average, secondary stacks 172 partially protrude further away from window substrate 110 more than primary stacks 171, and a portion of stack 172 is on the top surface of stack 171. In these examples, primary stacks 171 can directly interface window substrate 110 while secondary stacks 172 can be spaced away or at least partially spaced away from window substrate 110. In other examples, secondary stacks 172 directly interface window substrate 110 as well as the portion of the top surface of primary stacks 171, with good adhesion between primary stacks 171 and secondary stacks 172 and between secondary stacks 172 and window substrate 110 (e.g., that passes a tape test).

Figure 4B:
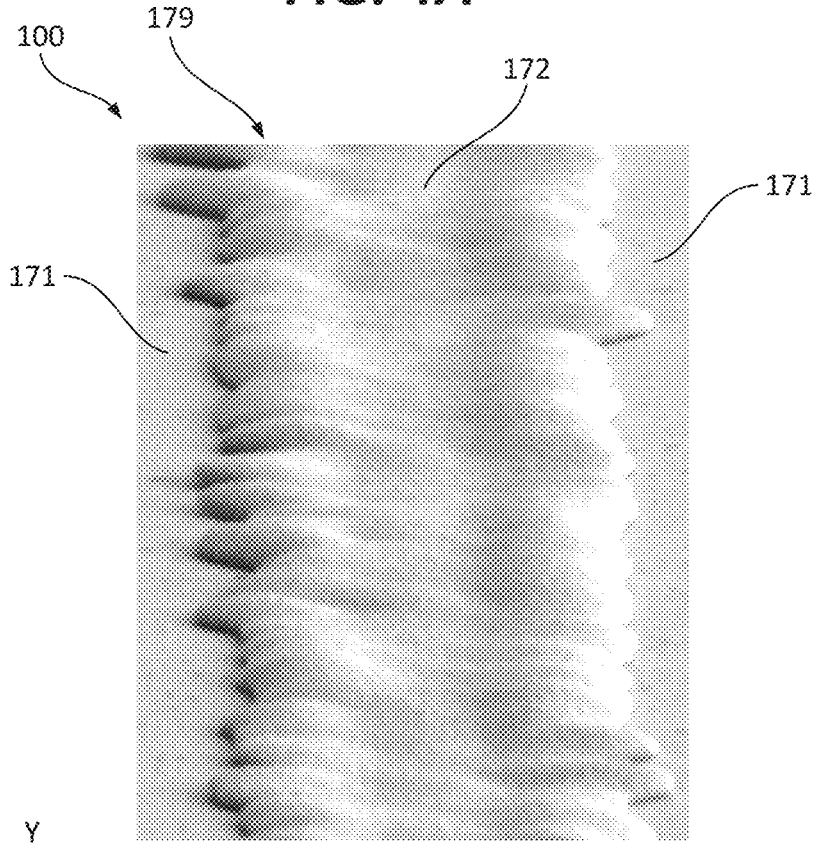
FIG. 4B is an SEM image of a pattern line illustrating the roughness of the pattern line edges.

In some examples, the pattern line edge is rough, and the line edge roughness (LER) is more than 100 nm, as shown in FIG. 4B. The LER definition is the root-mean-square deviation of the line edge profile shape from the straight line at a measurement length of 1 micrometer. In some examples, the LER is at least 10 nm, at least 20 nm, or even at least 100 nm. The rough line edge showed less overall less post photoresist cleaning, so that the better visual aesthetical performance.

Processing Examples

Figure 5:
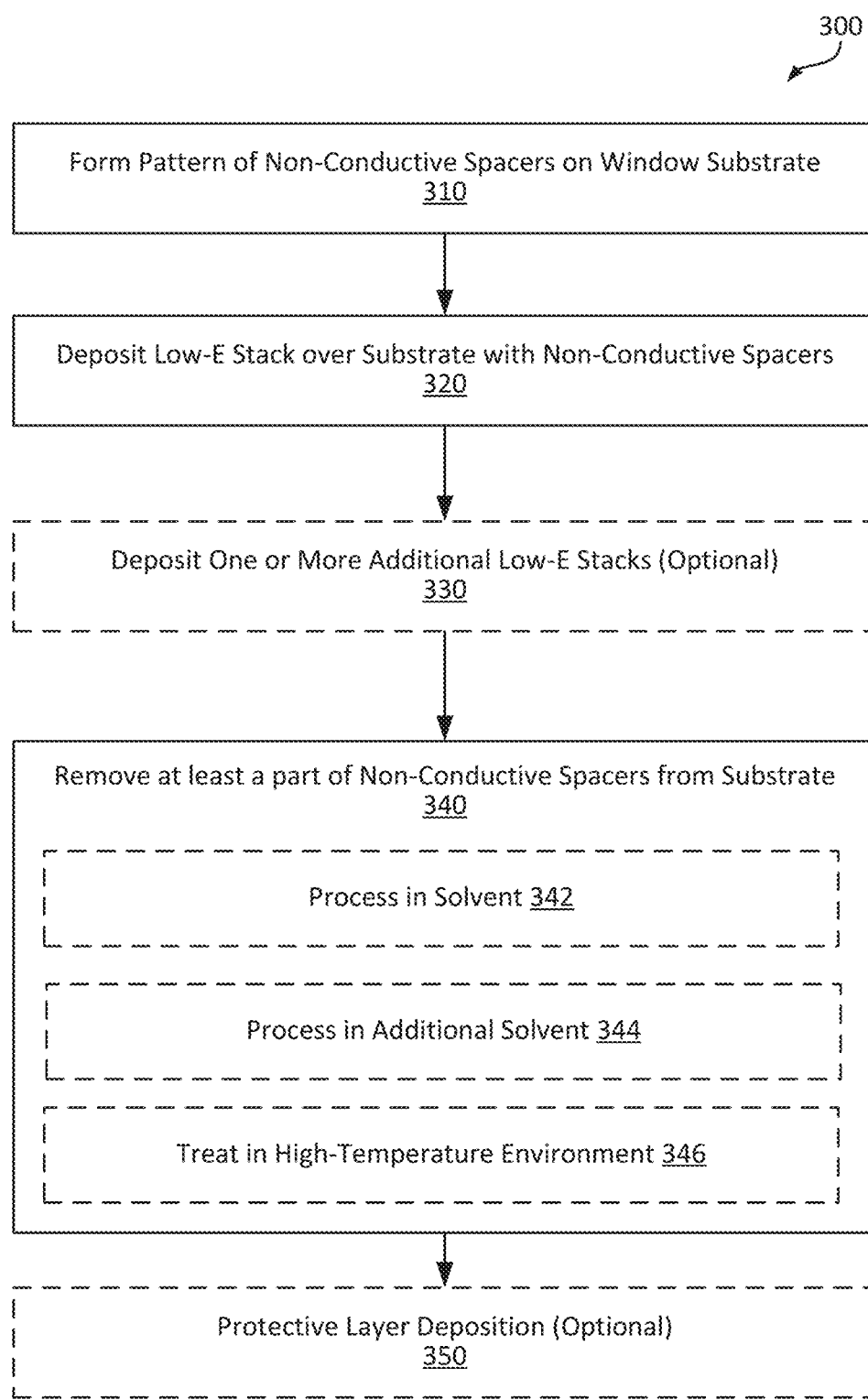
FIG. 5 is a process flowchart of a method for forming an energy-efficient signal-transparent window assembly, in accordance with some examples.

FIG. 5 is a process flowchart corresponding to method 300 of forming an energy-efficient signal-transparent window assembly 100, in accordance with some examples. Various examples of an energy-efficient signal-transparent window assembly 100 are described above.

Figure 6A:
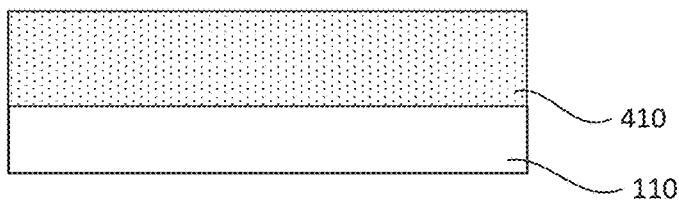
FIGS. 6A-6D are schematic cross-sectional views of various stages of the method while forming an energy-efficient signal-transparent window assembly, in accordance with some examples.

Method 300 may commence with forming (block 310) a pattern of spacers 180 on a window substrate 110. This spacer pattern defines gap pattern 179, which is formed at a later operation, i.e., when spacers 180 are removed. The pattern of spacers 180 may be formed, for example, using photolithography as, e.g., schematically shown in FIGS. 6A-6D. Specifically, FIG. 6A illustrates a processing stage during which an under-layer 410 is formed as a continuous coating on window substrate 110. The under-layer 410 is an optional component and, in some examples, under-layer 410 is not formed. The under-layer 410 may be used to generate an inverse taper in the spacers 180, e.g., as schematically shown and described below with reference to FIG. 6D.

Figure 6B:
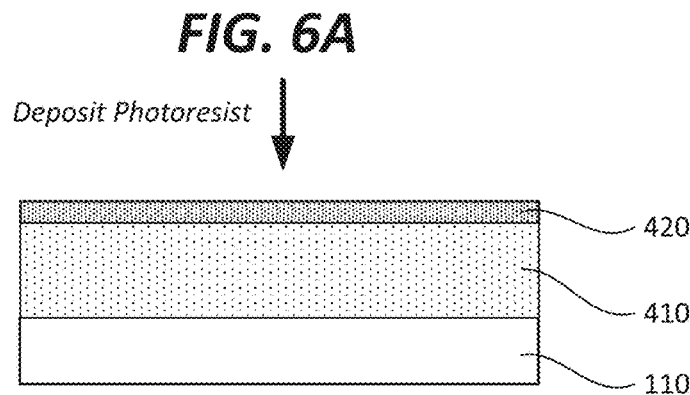

FIG. 6B illustrates a processing stage during which a photoresist layer 420 is formed over under-layer 410. In some examples (e.g., when under-layer 410 is not formed), photoresist layer 420 is directly interfacing the window substrate 110 (not shown). The photoresist layer 420 can be also formed as a continuous coating. The photoresist layer 420 may be formed as a positive photoresist or as a negative photoresist, which corresponds to whether the exposed portion of photoresist layer 420 is soluble or insoluble to a photoresist developer.

Figure 6C:
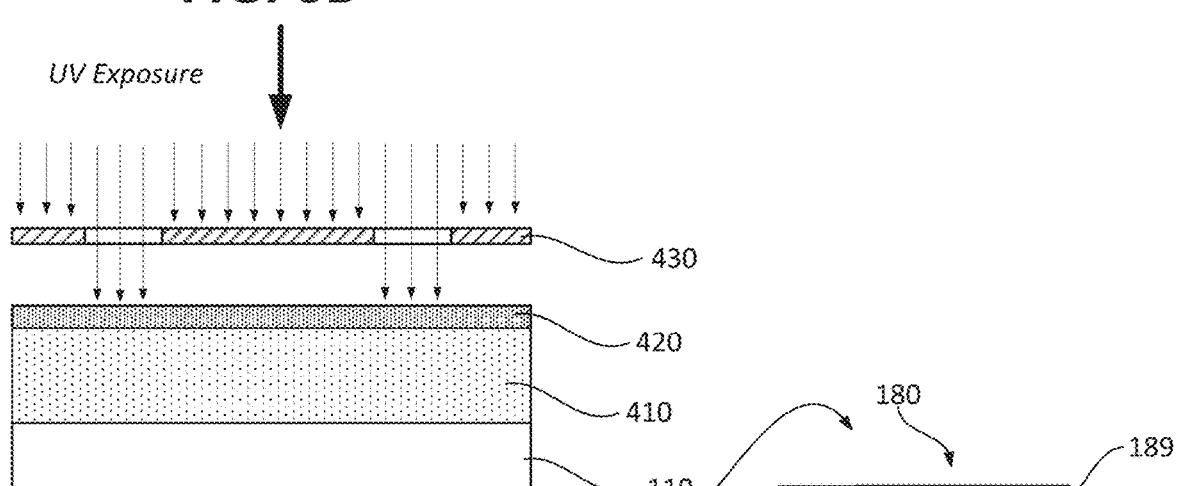
Figure 6D:
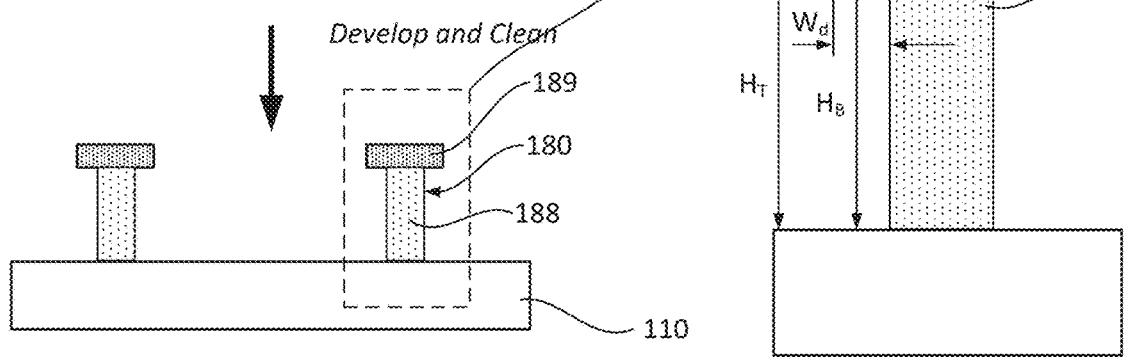

FIG. 6C illustrates a processing stage during which the photoresist layer 420 is exposed, e.g., using a photolithographic mask 430. Finally, FIG. 6D illustrates a processing stage after etching and cleaning the photoresist layer 420 and, if present, under-layer 410. Specifically, the photoresist layer 420 is converted into a spacer head 189, while the under-layer 410 (if present) is converted into spacer base 188. The materials of photoresist layer 420 and under-layer 410 may be selected such that the etching rate of the under-layer 410 is faster than that of the photoresist layer 420. For example, the micro-chem company provides combination of three materials for the under-layer 410, e.g., LOR A or LOR B or LOR C material product. The photoresist layer 420 may be formed from PMGI resists. Collectively, spacer head 189 and spacer base 188 form spacers 180. As a result, the spacer base 188 has a smaller width than the spacer head 189 resulting in an inverse taper of the spacer 180. In some examples, the width difference on each side ($W_d$ in FIG. 6D), which may be also referred to as an overhang, is 200-3,000 nanometers or, more specifically, 500-2,000 nanometers. In the same or other examples, the height of spacer base 188 ($H_B$ in FIG. 6D) is 200-800 nanometers or, more specifically, 300-600 nanometers. Furthermore, the total height of the spacer 180 ($H_T$ in FIG. 6D) is 300-5,000 nanometers or, more specifically, 400-1,200 nanometers.

Figure 6E:
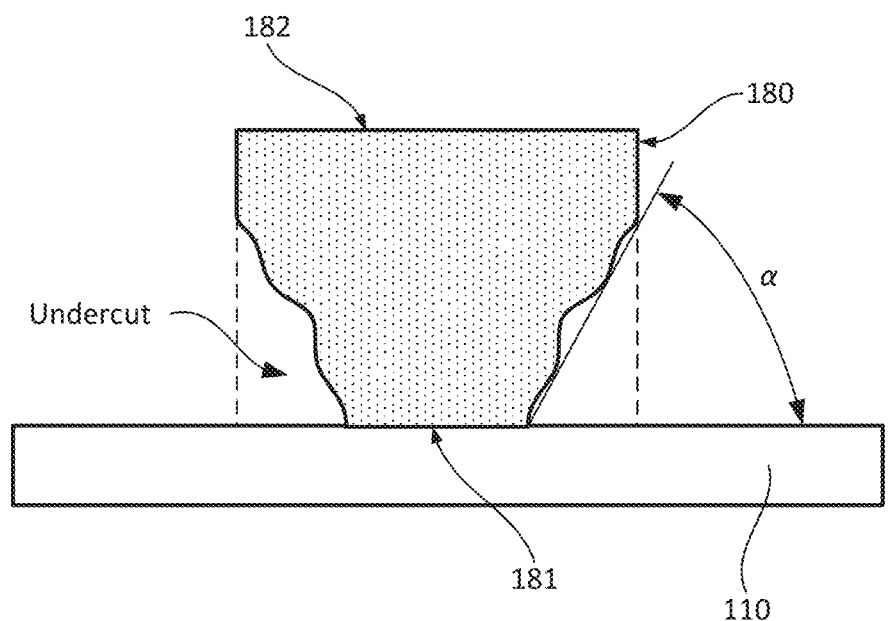
FIG. 6E is a schematic cross-sectional view of a spacer, showing an undercut, in accordance with some examples.

While FIGS. 6A-6D illustrate an example in which two layers are used to form spacers 180, one having ordinary skill in the art would understand that a single layer or more than two layers may be used to form spacers 180 with similar shapes. Specifically, spacers 180 may have a tapered structure, defined by an undercut. One such example is schematically shown in FIG. 6E. As described above, the undercut helps with forming the separation between disjoined structures 132 as further described below.

Referring to FIG. 6E, each spacer 180 has a substrate-interfacing surface 181 and a top surface 182, opposite of the substrate-interfacing surface 181. The width of the top surface 182 is larger than the width of the substrate-interfacing surface 181. In some examples, the difference between the width of the top surface 182 and the width of the substrate-interfacing surface is larger than 1,000 nanometers or even larger than 2,000 nanometers. In the same or other examples, the photoresist thickness or, more generally, the spacer height is less than 2,000 nanometers or even less than 1,000 nanometers.

Overall, a pattern of spacers 180 may be formed using lithography, materials extrusion, nozzle jetting, or indirect deformation mechanically, such as using a mold, stamp, or by laser, UV source, or electron beam curing or other heating source hardening, or combined those techniques.

Figure 7A:
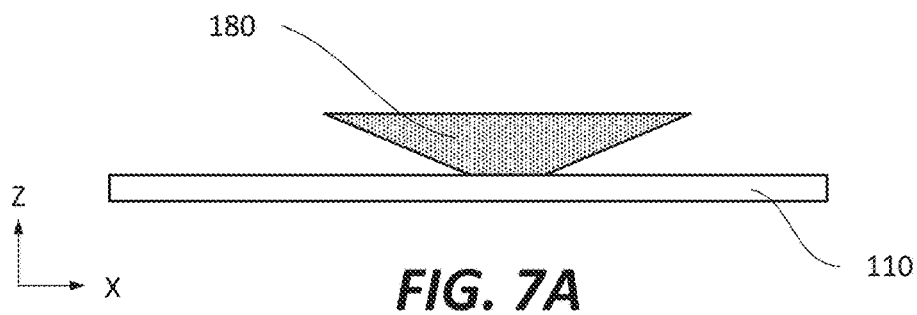
FIGS. 7A-7D are schematic views of additional stages of the method while forming an energy-efficient signal-transparent window assembly, in accordance with some examples.
Figure 7B:
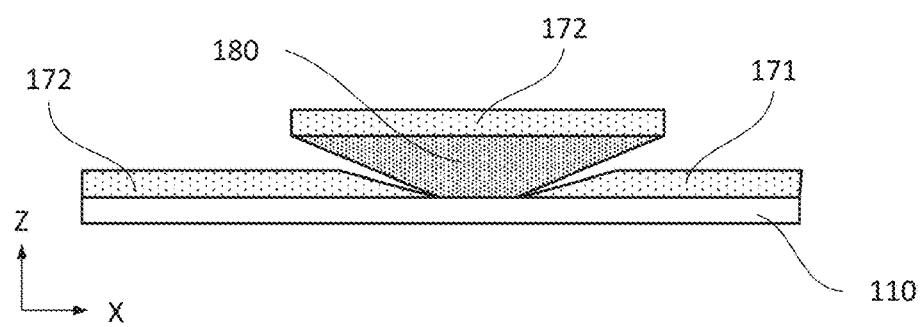
Figure 7C:
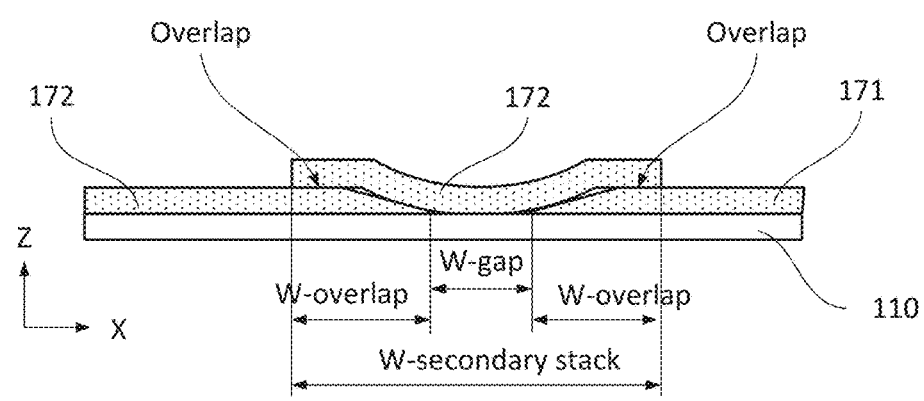
Figure 7D:
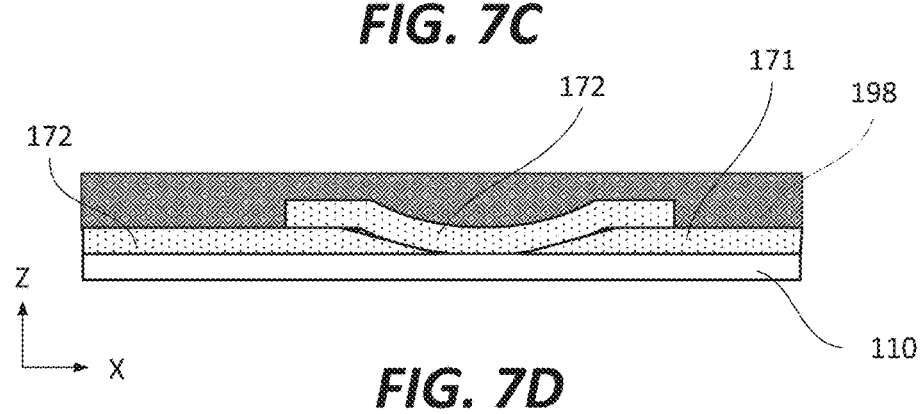

Returning to FIG. 5, method 300 proceeds with depositing (block 320) a stack assembly 170 over the window substrate 110 and also over the patterned spacers 180. As described above, the stack assembly 170 comprises a first layer 120, a conductive layer 130, a barrier layer 140, and a second layer 150. Each layer is formed in a separate operation using, e.g., physical vapor deposition (PVD). FIGS. 7A-7D illustrate different stages during this stack-forming operation. Specifically, FIG. 7A illustrates a pattern spacer 180 (having an inverse-taper shape/undercut) positioned over the window substrate 110. FIG. 7B illustrates a conductive layer 130 formed over the window substrate 110 and the spacer 180 and comprising disjoined structures 132 defined by the pattern spacers 180. These disjoined structures 132 are formed due to the spacers 180 protruding over the window substrate 110 (effectively forming a break in the conductive layer 130 due to the protruding thickness).

For the deposition of the barrier layer 140 and the second layer 150, various ways of controlling the deposition extension (of each layer forming a stack in) and the undercut area of the photoresist (PR) are within the scope.

The sidewall protection of the conductive layer 130 (with the barrier layer 140 and second layer 150) has demonstrated excellent environmental and thermal durability. The environmental durability was tested by dipping a sample for one hour into a boiling water container. The thermal durability was tested using 650° C. baking for 8 minutes for a 3-millimeter thick coating on the glass substrate, or 650° C. baking for 7 minutes for a 0.5-millimeter thick glass coating. There were no noticeable defects under the microscope inspection. These sidewall conductive layer protection designs and methods apply to any number of layers in a stack.

These sidewall conductive layer protection designs and methods apply to any type of stack and any number of layers in each stack. Both highly non-directional processes (e.g., high-pressure processes) and directional processes (e.g., low-pressure processes) are within the scope.

In some examples, method 300 comprises depositing (block 330) one or more additional stacks over stack assembly 170, which is disposed over window substrate 110 and spacers 180. Specifically, various operations of depositing a first layer 120, a conductive layer 130, a barrier layer 140, and a second layer 150 (described above) may be repeated one or more times.

In some examples, method 300 comprises removing (block 340) spacers 180 from energy-efficient signal-transparent window assembly 100. For example, energy-efficient signal-transparent window assembly 100 may be tempered (e.g., subjected to high temperatures) turning the spacers 180 into volatile species, which are removed from the environment with oxygen, such as air. The spacer materials can also be removed or partially removed by using a plasma process using a gas containing oxygen and/or nitrogen gas. For example, spacers 180 can comprise materials that could be burned out completely in an oxygen-containing environment (e.g., air) without any residues. In some examples, spacers 180 comprise one or more of the following five elements: carbon (C), hydrogen (H), oxygen (O), nitrogen (N), and sulfur(S). The absence of other elements from the spacer composition ensures the residual-free removal of spacers 180.

In some examples, the conventional oxygen-based methods for photoresist removal, which include oxygen plasma or high-temperature oxygen techniques, often result in the retention of some significant residues 194. These residues are typically found between the secondary stacks 172, the window substrate 110, and the primary stacks 171. Such residues 194 can lead to the formation of large voids 190 (e.g., a few hundred of nanometers), occurring between the primary stacks 171 and secondary stacks 172, or between the window substrate 110 and secondary stacks 172. This, in turn, results in noticeable, tiny reflective spots when exposed to intense light, such as direct sunlight, which is not desirable.

In some examples, the removal of spacers 180 (e.g., comprising a photoresist) comprises the immersion of the window substrate 110 with the spacers 180 and the stack assembly 170 (e.g., containing metal, oxide or nitride materials) into a processing solution (process 342 in flow FIG. 5) followed by high-temperature treatment in a controlled-temperature oven (process 346 in flow FIG. 5). Specific examples of the processing solution and high-temperature treatment are described below. This spacer-removal process has demonstrated exceptional efficacy in minimizing photoresist residue levels post-treatment. In some examples, the residual gap is minimized to less than 200 nanometers or, more specifically, to less than 100 nanometers, even leaving no residue and no gaps. Furthermore, this spacer-removal process enhances the adhesion of the second stack 172 to both the window substrate 110 and the primary stack 171 and, as such, diminishes the visibility of minuscule reflective spots, even under intense lighting conditions.

The processing solution (process 342 in flow FIG. 5) may comprise one or more solvents selected from the group of ketones, alcohols, esters, ethers such as acetone, isopropyl alcohol (IPA), methyl ethyl ketone (MEK), dimethyl carbonate (DMC), and ethyl acetate. Specifically, these solvents may contain one or more of the following functional groups: C=O, —OH, COO, and C—O—C, which showed excellent performance to change the photoresist into an organic film connecting the stacks 172 with the substrate and the 171 stack surface. The molecular weight of these solvents is less than 300 g/mol or less than 100 g/mol to ensure low viscosity.

The viscosity may be less than 0.01 Pa·S. For example, higher-viscosity solvents, such as propylene glycol monomethyl ether acetate (PGMEA), which is a widely used photoresist cleaning solvent and is effective in photoresist removal, may also undesirably strip the secondary stack 172 and should not be used. Aromatic hydrocarbons, such as toluene, and xylene, can effectively clean photoresist but are toxic.

Furthermore, the processing solution may have a water content of less than 10% since water can be damaging to the conductive layer 130 (e.g., silver). The solvent may also not be acidic or basic, the PH value is limited within 6.5 to 7.5, and may not contain ammonia since ammonia (like water) can be also damaging to the conductive layer 130 (e.g., silver).

In some examples, this spacer-removal process may involve dipping into only one processing solution, followed by high-temperature treatment. Alternatively, a sequential dipping process in two or more different processing solutions (having different compositions may be used). For example, the initial processing solution/solvent may be selected from the list mentioned in the preceding paragraph (process 342). The second processing solution/solvent may be used to cleanse the sample surface (process 344).

Specifically, the initial processing solution/solvent (which dissolves the photoresist) may leave residues in the area outside of the pattern lines. The second processing solution/ solvent (process 344 in FIG. 5) effectively cleans these residues. The criteria for choosing the second solvent are based on the following: (a) Compatibility: The second solvent must be compatible with the initial solvent, meaning it should be able to dissolve or suspend any residues left by the initial solvent. (b) Volatility: A higher volatility compared to the initial solvent is often desirable. This ensures that it can evaporate quickly and completely, leaving no residues. (c) Non-reactivity: The second solvent should not react with or damage the substrate or any other materials in the system. (d) Cleaning Efficiency: The second solvent should have good solubilizing power for the residues while being gentle enough not to affect the underlying patterns or materials. (e) Environmental and Safety Considerations: The second solvent is less hazardous and more environmentally friendly. Some examples for the second solvent include one or a mixture of acetone, isopropyl alcohol (IPA), ethanol, and methanol. Specific combinations of the first initial solvent and second solvent include but are not limited to (1) dimethyl carbonate and (2) acetone, (1) methyl ethyl ketone (MEK) and (2) acetone, and (1) ethyl acetate and (2) acetone.

In some examples, the post-chemical solvent cleaning process is followed by the high-temperature treatment process (process 346 in FIG. 5). It should be noted that the high-temperature glass treatment process is optional dependent on the product application need. Specifically, the high-temperature glass treatment comprises passing the energy-efficient signal-transparent window assembly 100 through a furnace heated to temperatures greater than 600° C. or even greater than 800° C. This specific duration of this high-temperature glass treatment is designed to enhance the glass's strength and resistance to thermal stress.

In some examples, a transparent organic layer 196 is positioned between the secondary stacks 172 and the window substrate 110/stack primary stacks 171. This transparent organic layer 196 is formed by combining the partial of photoresist remaining and the solvent. After the transparent organic layer 196 is baked at a high-temperature process, which is a typical glass coating process, thus, this transparent organic layer 196 functions as an adhesive intermediary, ensuring the robust attachment of stack 172. The transparency of the transparent organic layer 196 ensures that no patterning is visible, even under direct sunlight. Furthermore, the energy-efficient signal-transparent window assembly 100 consistently passes adhesion tests, such as the tape test. The transparent organic layer 196 is characterized by significant carbon content (e.g., greater than 10% atomic) and is distinct from the primary stacks 171, secondary stacks 172, and window substrate 110 (based on the composition). This transparent organic layer 196 has a thickness of less than 200 nanometers, even more specifically less than 100 nanometers, or even less than 20 nanometers. In some cases, there are no voids or empty spaces inside or next to the organic layer 196.

It should be noted that a stack assembly 170 positioned over spacers 180, which may be referred to as secondary stacks 172, is effectively lowered onto window substrate 110. In some examples, method 300 comprises forming (block 350) a protective layer 198 over stack assembly 170, covering the entire surface of the second layer 150 on one side of the energy-efficient signal-transparent window assembly 100. Additionally, such a signal-transparent low-E coated glass can also be laminated with another glass substrate, similar to FIG. 3A.

Additional Pattern Generation Examples

Referring to FIGS. 8A-8I, in some examples, a dry photoresist film 920 is used (instead of a wet photoresist process described above with reference to FIGS. 5 and 6A-6D). Specifically, a dry photoresist film 920 comprises a release layer 922, an inner layer 926, and a dry photoresist layer 924 positioned between and encapsulated by the release layer 922 and the inner layer 926. Each of the release layer 922 and the inner layer 926 may be made from one or more of polyethylene terephthalate (PET), polycarbonate (PC), polyvinyl chloride (PVC), and polyethylene (PE).

It should be noted that traditional bilayer processes use wet photoresists (in a liquid state) before being coated on substrates. These processes require expensive lithography equipment and can be complex. A dry photoresist process can be implemented with less sophisticated equipment, e.g., without the need for expensive exposure and optical systems. However, dry photoresist presents various challenges in achieving small features due to their loose structure.

Figure 8A:
FIGS. 8A-8I are schematic cross-sectional views of various stages of the dry photoresist method while forming an energy-efficient signal-transparent window assembly, in accordance with some examples.

Referring to FIG. 8A, a bottom photoresist layer 910 is coated on a window substrate 110, which may be achieved using a slit coater on a larger size substrate. The bottom photoresist layer 910 may comprise one or more organic materials. The viscosity (of a coated material) may be 1-10,000 centipoise (cP). The thickness of a bottom photoresist layer 910 may be 0.5-5 micrometers or, more specifically, 1-2 micrometers. The process may proceed with curing the bottom photoresist layer 910 (a transition from FIG. 8A to FIG. 8B), e.g., using UV exposure or a soft bake at around 70-200° C. for 1-30 minutes (such as at 105° C. for 10 minutes). This operation transforms the bottom photoresist layer 910 into a solid-like state, as shown in FIG. 8B.

Figure 8C:
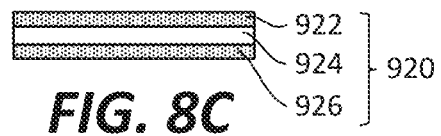
Figure 8B:
Figure 8D:
Figure 8E:
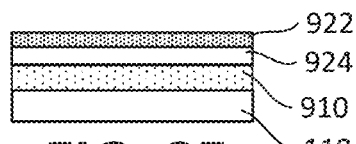
Figure 8F:
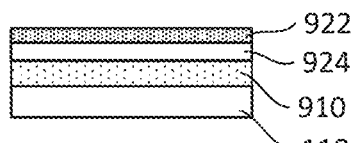
Figure 8G:
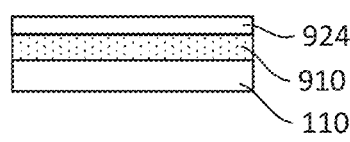

As shown in FIG. 8C, a dry photoresist film 920 comprises a release layer 922, an inner layer 926, and a dry photoresist layer 924 positioned between and encapsulated by the release layer 922 and the inner layer 926. The inner layer 926 is first peeled off so that the dry photoresist layer 924 is exposed, e.g., as shown in FIG. 8D, and can be laid on the solid-like bottom layer film, as shown in FIG. 8E. A heated laminator roll then pushes the dry photoresist layer 924 and the bottom photoresist layer 910, removing bubbles from the edges, as shown in FIG. 8F. This lamination operation may be performed at a temperature of 50-200° C. (e.g., 70° C.). The thickness of the dry photoresist layer 924 may be 2-50 micrometers or, more specifically, 5-15 micrometers.

Figure 8H:
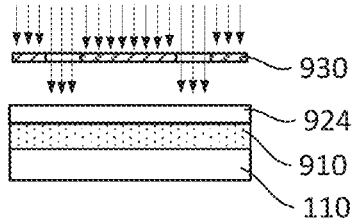
Figure 8I:
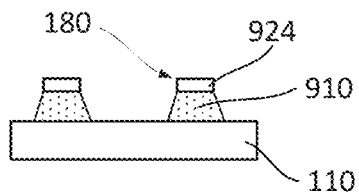

In the next step, the release layer 922 may be removed and the remaining structure or, more specifically, a combination of the dry photoresist layer 924 and the bottom photoresist layer 910 may be exposed using a mask 930, e.g., as shown in FIG. 8H. A set of spacers 180 defined by the mast pattern are formed through the developing step, e.g., as shown in FIG. 8I. Specifically, the two-layer stack, developer solution, and specific process conditions may be used to modify the pattern cross-section profile.

The advantage of this dry photoresist process is that the exposure, mask, and associated optical systems can be significantly simplified, leading to reduced costs and improved process stability. Specifically, a bilayer structure originally comes from (i) a 3-layer structure of the dry photoresist film 920 film with two protective layers on both sides and (ii) bottom solid-like materials. Furthermore, a unique intermediate structure comprising a window substrate 110, a bottom photoresist layer 910, a dry photoresist layer 924, and a release layer 922, e.g., as in FIG. 8E is produced. The process uniquely includes peeling off the release layer 922 and laminating the dry photoresist layer 924 with a bottom photoresist layer 910 (which may be solid-like bottom like) provided on the window substrate 110.

A bottom photoresist layer 910 is in a liquid state initially, e.g., suitable for uniform coating using slit coating equipment. The bottom photoresist layer 910 is converted into a solid-like state during a curing operation (e.g., thermal treatment or UV exposure) to form a stable film. Furthermore, the bilayer structure (comprising the bottom photoresist layer 910 and the dry photoresist layer 924) may use different developers to control different layer structures. Since common dry photoresists, such as Riston ST900 dry PR, can be developed through alkaline developers, the cured bottom material is required to be resistant to alkaline developers and will not be corroded. Alternatively, some special dry PR is developed through a developer other than an alkaline solution, for example, DF-2005 from Nagase Company, and its developer is cyclohexanone. In such cases, the bottom layer material can be LOR-A from Kayaku Advanced Materials, with an alkaline solution as the developer.

There are a few examples of bottom photoresist layer 910 (which may be referred to as wet photoresist) integrating with Riston ST900 dry PR or Nagase's dry film, and the low-E coating performance in optical, thermal, and durability tests passed the product specification requirements: polyimide, SU-8 photoresist, a commonly used epoxy-based negative photoresist, or LOR-A from Kayaku Advanced Materials. Specifically, polyimide as a bottom coating material, initially in a liquid state, uniformly applied using slit coating equipment, cured at 200° C. to form an alkaline-resistant film. This film can be removed or etched using NMP solvent. SU-8 photoresist as a bottom coating material, initially in a liquid state, uniformly applied using slit coating equipment, cured through UV exposure and subsequent baking at 95° C., forming an alkaline-resistant structure. This structure can be removed using acetone or PGMEA solvent. The LOR-A from Kayaku Advanced Materials as the bottomed layer material: initially in a liquid state, uniformly applied using slit coating equipment, cured through baking at 105° C., which can resist the dry PR DF-2005 developer of cyclohexanone. This structure can be removed using an alkaline solution developer.

After the dry-photoresist lithography process in FIGS. 8A-8I, the pattern of spacers 180 on the window substrate 110 is formed, which corresponds to the pattern forming operation (block 310 in FIG. 5). The remaining operations may be the same as in FIG. 5, e.g., the low-E stacks can be deposited in the corresponding deposition operations (block 320-block 350 in FIG. 5).

Figure 9A:
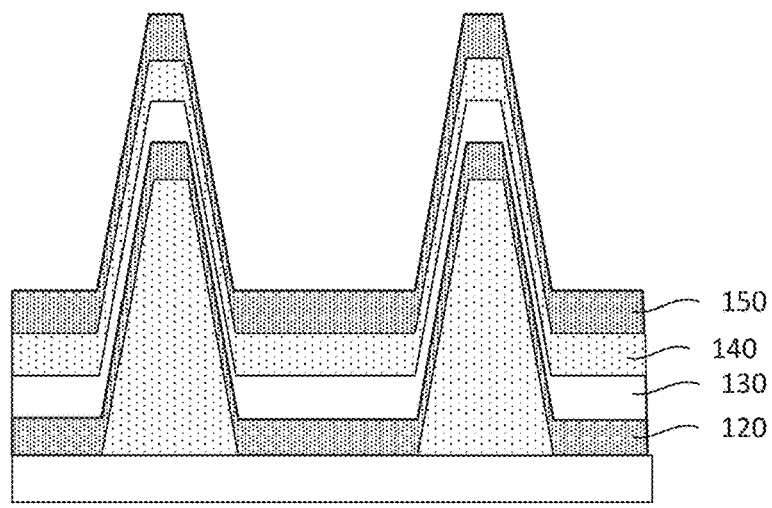
FIG. 9A is a schematic illustration of an energy-efficient coating structure, comprising pattern lines attached to the substrate, in accordance with some examples.
Figure 9B:
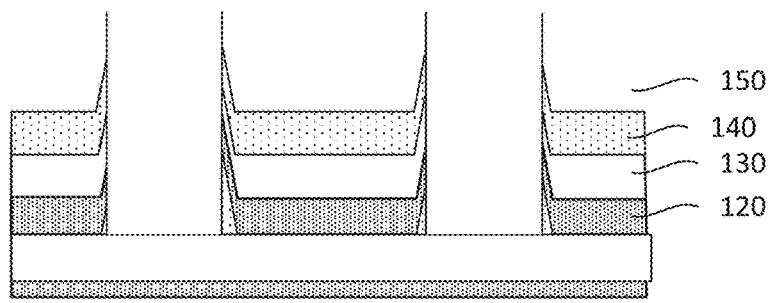
FIGS. 9B and 9C are schematic illustrations of an energy-efficient coating structure, comprising pattern lines attached to the substrate, at post treatments, in accordance with some examples.
Figure 9C:
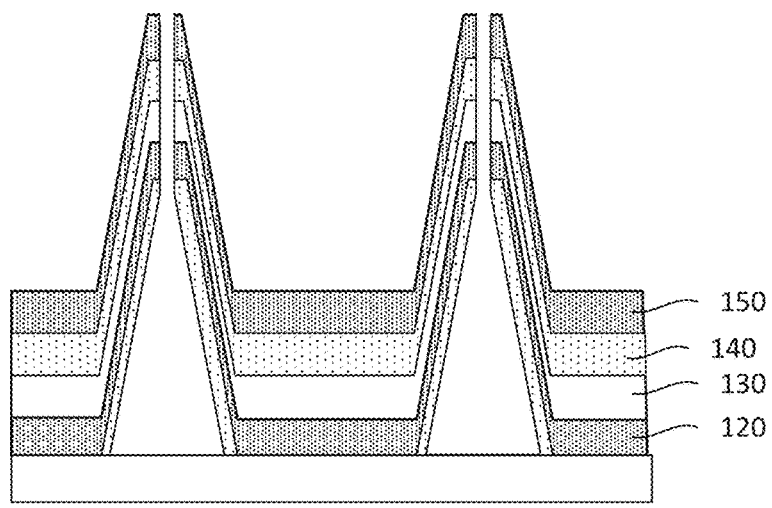

In some examples, non-undercut profile of the photoresist, as showed in FIGS. 8I, could allow the mobile signal penetrate through the patterned low-E coating glass after a special treatment process, We found that the photoresist thickness can significantly influence the mobile signal penetration at a rectangular or taper profile photoresist. FIG. 9A is a schematic illustration of an energy-efficient coating structure, comprising pattern lines attached to the substrate, in accordance with some examples. Multiple iterations of the structure can be applied to the structure in FIG. 9A on a window substrate, in accordance with some examples. For instance, when the photoresist thickness is 0.5 micrometer, the mobile signal is blocked by the patterned low-E coated glass. However, increasing the photoresist thickness to 1.5 micrometers or 5 micrometer or more, and applying a special treatment, such as heat treatment at 650° C. for 7 minutes and surface cleaning on one-millimeter-thick glass, allows the mobile signal to penetrate the patterned low-E coating glass. Further study found that with a thicker photoresist, the low-E coating on top of the photoresist can break after heat treatment combined with other activities, for example, naturally during the glass cleaning process or other production processes. The coating can then take a form shown in FIG. 9B or 9C. The photoresist spacer is almost burn out during the heat treatment, and the coatings on the top or the side of those spacers are broken or peeled off during the post cleaning process or other production procedures, causing the conductive layers to be physically discontinued along the spacer patterns. The remaining conductive coating of the plurality of second stacks, originally next to the top or side of the spacer, showed significantly different distance to the substrate surface, ranging from at least 50 nanometers up to 50 micrometers, compared to the conductive coating of the primary stack. The plurality of secondary stacks are broken on the top or side of the spacer pattern, physically isolated, thus discontinuing the conductive layers along the spacer patterns. The assembly includes non-conductive structures within the conductive layer, creating primary stacks and partial secondary stacks that are electrically isolated along the spacer pattern.

Any specialized processes that meet the mobile signal penetrating aspects are within the scope of this patent: forming non-conductive structures within the conductive layer, thereby creating primary stacks that are electrically isolated by the spacer pattern.

In some examples, the layer 910 shown in FIGS. 8A and 8B may be omitted, or the process may start directly from FIG. 8C without including FIGS. 8A and 8B. In this case, the dry film is directly coated onto the substrate 110.

In some examples, a protective layer 198 conforms to the entire surface of the second layer 150, covering the entire surface (on one side) of the energy-efficient signal-transparent window assembly 100. Excellent durability performance was achieved after exposure to ambient conditions for six months.

Such a signal-transparent low-E coated glass can also be laminated with another glass substrate, similar to FIG. 3A, but the coating is replaced with FIG. 9A. In some examples, the additional bonding layer 197 alone or combined with the protective layer 198, or both may be made from the same material (i.e., have the same composition) or different materials (i.e., have different compositions).

Experimental Results

Various tests have been conducted to evaluate the performance of energy-efficient signal-transparent window assemblies prepared in accordance with various examples listed above. Uncoated glass samples and conventional low-E coating samples were used as references. The results are presented in FIG. 10.

Specifically, conventional low-E coating samples and energy-efficient signal-transparent window assemblies with patterned conductive layers utilized the same low-E stack, i.e., a first layer formed from ZnSnO, a conductive layer formed from silver, a barrier layer formed from NiCr alloy, and a second dielectric layer formed from ZnSnO. The overall coating size was 55 millimeters×55 millimeters. The pitch size of the pattern was 0.25-0.5 millimeters, the pattern line width was 4-5 micrometers.

Figure 10:
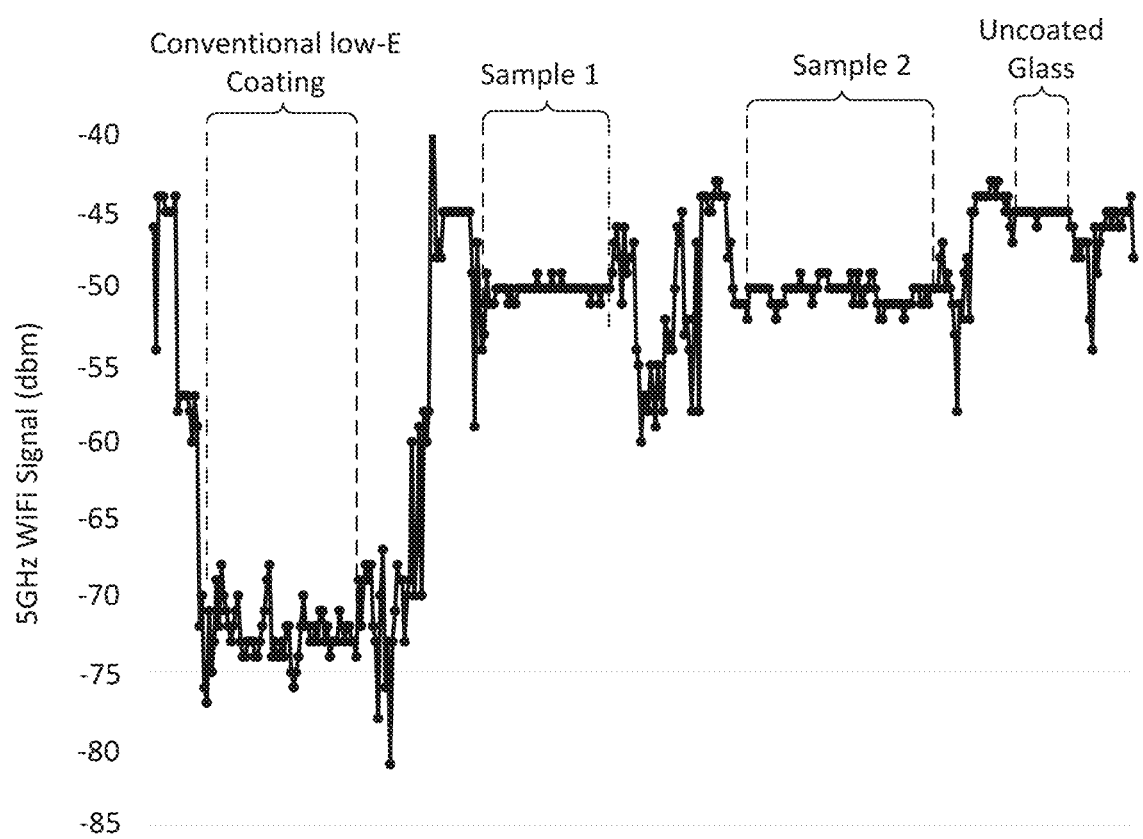
FIG. 10 illustrates test results of energy-efficient signal-transparent window assemblies.

Referring to FIG. 10, the electromagnetic wave penetration of wireless signal (e.g., cellular phone signal) was tested using the following method. A heavy-duty 16 GA welded steel box leaves a window open with a size of 50 millimeters by 50 millimeters. The box simulates a building, which electromagnetic waves cannot penetrate. Only the window in the box allows electromagnetic wave penetration. The signal source, used for this experiment, was a router with 5 GHz (wavelengths of 60 millimeters). A cell phone, APPLE IPHONE® 7, was used as a signal receiver. The phone was equipped with a software application "AirPort Utility" to measure the Wi-Fi signal intensity, and recorded the Wi-Fi signal data every 5 seconds, as received by phone. The phone was placed inside the box facing the window. A reference test with a blank substrate glass on the window of the box has shown a signal strength of around-45 DBm, which is a reference baseline for the Wi-Fi signal in the box. A low-E-coated glass was tested on the window as another reference, and the signal strength in the box dropped from around-75 DBm to 72 DBm. As such, two different glass samples have shown nearly 30 DBm difference or around 1000-time signal intensity reduction due to the low-E coating on the glass. Then, two invention prototype samples with the pattern on low-E coated glass were tested on the window, and the signal strength in the box only slightly drop, as around-50 DBm, or the difference from the pure glass only around 5 DBm. These results clearly demonstrated that the prototype sample of patterned low-E coating glass significantly improves the Wi-Fi signal transmission.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered illustrative and not restrictive.

The invention claimed is:

1. An energy-efficient signal-transparent window assembly comprising:
   a window substrate;
   a first layer disposed over the window substrate;
   a conductive layer disposed over the first layer such that the first layer is disposed between the conductive layer and the window substrate, wherein the conductive layer is formed by multiple disjoined structures separated by gaps; and
   a second layer disposed over the conductive layer such that the conductive layer is disposed between the second layer and the first layer, wherein:
      the first layer, the conductive layer, and the second layer form a plurality of primary stacks and a plurality of secondary stacks over at least a portion of the window substrate,
      the plurality of secondary stacks forms a pattern, defined by pattern lines, partially on the window substrate, and partially on a top surface of the plurality of primary stacks, and
      each of the pattern lines has a width larger than a gap separating the multiple disjoined structures by at least 0.4 micrometer.

2. The energy-efficient signal-transparent window assembly of claim 1, wherein the second layer comprises a barrier material, which comprises one of nickel or titanium.

3. The energy-efficient signal-transparent window assembly of claim 1, wherein each of the plurality of secondary stacks directly interfaces the window substrate.

4. The energy-efficient signal-transparent window assembly of claim 1, wherein each of the plurality of secondary stacks is attached to the window substrate and the plurality of primary stacks using a connection layer comprising one of (a) a continuous material layer and (b) a non-continuous material layer and air voids.

5. The energy-efficient signal-transparent window assembly of claim 4, wherein the connection layer comprises carbon at a concentration of greater than 10% atomic.

6. The energy-efficient signal-transparent window assembly of claim 4, wherein the connection layer has a thickness of 1-1000 nanometers.

7. The energy-efficient signal-transparent window assembly of claim 4, wherein the connection layer is formed using a solution comprising one or more functional groups selected from the group consisting of C=O, —OH, COO, and C—O—C.

8. The energy-efficient signal-transparent window assembly of claim 1, wherein the width of each stack in the plurality of secondary stacks is between 1 micrometer and 100 micrometers.

9. The energy-efficient signal-transparent window assembly of claim 1, further comprising a protective layer disposed over the plurality of primary stacks and the plurality of secondary stacks.

10. The energy-efficient signal-transparent window assembly of claim 9, wherein the protective layer comprises a transparent material with a refractive index between 1.6 and 1.9 at wavelength 550 nanometer.

11. The energy-efficient signal-transparent window assembly of claim 1, further comprising an additional window substrate, wherein the first layer, the conductive layer, and the second layer are positioned between the window substrate and the additional window substrate.

12. The energy-efficient signal-transparent window assembly of claim 1, wherein each stack in the plurality of primary stacks comprises two adjacent sidewalls formed by extending the second layer in each stack to the window substrate and completely sealing the conducting layer between the window substrate and the second layer.

13. The energy-efficient signal-transparent window assembly of claim 1, wherein the width of the secondary stack is between 2 and 10 micrometers.

14. An energy-efficient signal-transparent window assembly comprising:
   a window substrate;
   a first layer disposed over the window substrate;
   a conductive layer disposed over the first layer such that the first layer is disposed between the conductive layer and the window substrate, wherein the conductive layer is formed by multiple disjoined structures separated by gaps; and
   a second layer disposed over the conductive layer such that the conductive layer is disposed between the second layer and the first layer, wherein:
      the first layer, the conductive layer, and the second layer form a plurality of primary stacks, each comprising two sidewalls and separated from each other by the gaps,
      the gaps form a pattern, defined by pattern lines, and
      each of the pattern lines has a width larger than the gaps separating the multiple disjoined structures by between 0.4 and 6 micrometers.

15. The energy-efficient signal-transparent window assembly of claim 14, further comprising a protective layer disposed over the plurality of primary stacks, comprising a transparent material with a conductivity of less than 1 S/M.

16. The energy-efficient signal-transparent window assembly of claim 14, further comprising an additional window substrate, wherein the plurality of primary stacks is positioned between the window substrate and the additional window substrate.

17. An energy-efficient signal-transparent window assembly comprising:
   a window substrate;
   non-conductive spacers, forming a pattern on the window substrate, interfacing a portion of the window substrate, and blocking the portion of the window substrate;
   a first dielectric layer, interfacing the window substrate and the non-conductive spacers;
   a conductive layer, disposed over the first dielectric layer such that the first dielectric layer is disposed between the conductive layer and each of the window substrate and the non-conductive spacers;
   a second layer disposed over the conductive layer such that the conductive layer is disposed between the second layer and the first layer; and
   non-conductive structures positioned within the conductive layer and forming a plurality of primary stacks and a plurality of secondary stacks, wherein:
      the first layer, the conductive layer, and the second layer form a plurality of primary stacks and a plurality of secondary stacks over at least a portion of the window substrate,
      the plurality of secondary stacks forms a pattern, defined by spacer pattern lines, partially on the window substrate and partially on a top surface of the plurality of primary stacks, and
      the spacer pattern lines comprise a top surface and a side surface,
      stacks of the plurality of secondary stacks are broken on the top surface or the side surface of the spacer pattern line thereby physically isolating the stacks and discontinuing the conductive layers along the spacer pattern lines.

18. The energy-efficient signal-transparent window assembly of claim 17, wherein the spacer pattern lines are formed using a lithography process with a photoresist thickness greater than 1.5 micrometers.

19. The energy-efficient signal-transparent window assembly of claim 17, further comprising forming a protective layer disposed over the stack and comprising a transparent material with a conductivity of less than 1 S/M.

20. The energy-efficient signal-transparent window assembly of claim 17, wherein the stack is bonded an additional window substrate such that the stack and the non-conductive spacers are positioned between the window substrate and the additional window substrate.

* * * * *